United States Patent [19]
Kakazu et al.

[11] Patent Number: 5,388,199
[45] Date of Patent: Feb. 7, 1995

[54] INTERACTIVE GRAPHIC INPUT SYSTEM

[75] Inventors: Yukinori Kakazu, Ebetsu; Noburo Minami, Numazu; Yasuhiko Tamada, Mishima; Hiroaki Uno, Numazu, all of Japan

[73] Assignee: Toshiba Kikai Kabushiki Kaisha, Tokyo, Japan

[21] Appl. No.: 23,148

[22] Filed: Feb. 24, 1993

Related U.S. Application Data

[63] Continuation of Ser. No. 639,141, Jan. 9, 1991, abandoned, which is a continuation of Ser. No. 498,480, Mar. 23, 1990, abandoned, which is a continuation of Ser. No. 40,599, Apr. 20, 1987, abandoned.

[30] Foreign Application Priority Data

Apr. 25, 1986 [JP] Japan ................... 61-96627
Apr. 25, 1986 [JP] Japan ................... 61-96628

[51] Int. Cl.⁶ .............................. G06F 15/62
[52] U.S. Cl. ..................... 395/155; 395/120
[58] Field of Search ............. 395/100, 119, 120–128, 395/155, 161, 159; 340/723

[56] References Cited

U.S. PATENT DOCUMENTS

| | | | |
|---|---|---|---|
| 4,618,924 | 10/1986 | Hinds | 364/141 |
| 4,641,270 | 2/1987 | Lalloz et al. | 364/476 |
| 4,649,498 | 3/1987 | Kedem et al. | 364/518 |
| 4,736,306 | 4/1988 | Christensen et al. | 364/513 |
| 4,739,488 | 4/1988 | Asakura | 364/474 |

OTHER PUBLICATIONS

"What to Look For in a CAD/CAM System", Hanson et al., Jun. 1986, 47–50.

*Primary Examiner*—Heather R. Herndon
*Attorney, Agent, or Firm*—Koda and Androlia

[57] ABSTRACT

In the conventional CAD or CAM system, when a shape must be defined, it should use mathematical models which are formed by B-Reps or CSG method. B-Reps method is more complicated than CSG in data structure and in processing. This invention attempts to utilize merits of the CSG method, express component elements of a three-dimensional solid model in a hierarchical structure so that an element of a a higher order can relocate another element of a lower order on its coordinate system, and an interactive operation can be employed in defining. This method allows an operator to ascertain the progress of the works with his/her own eyes to greatly simplify the works of shape defining of solid models.

14 Claims, 35 Drawing Sheets

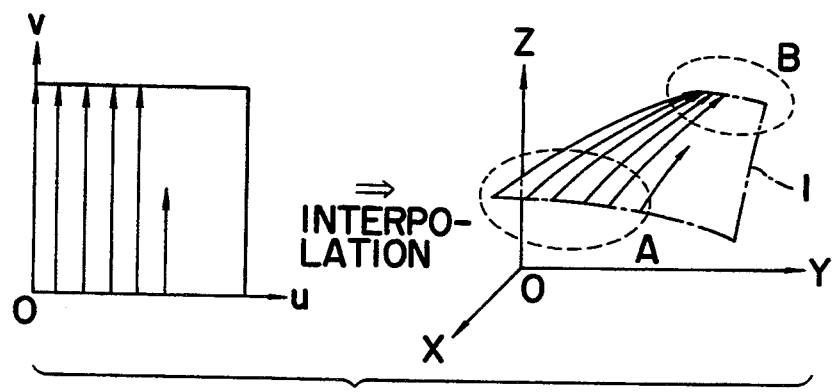
F I G. 4
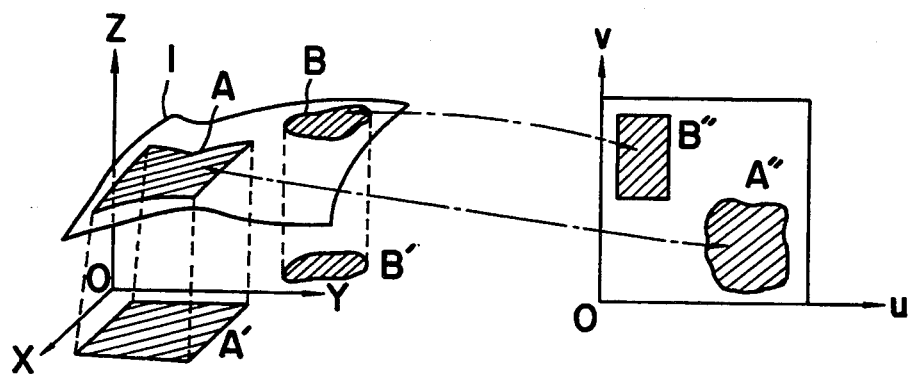
F I G. 5
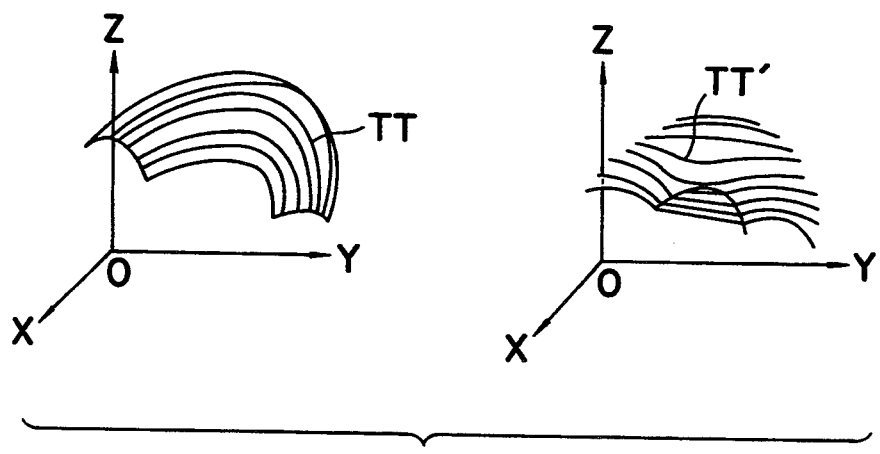
F I G. 6

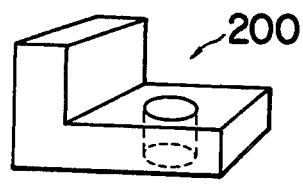
F I G. 8
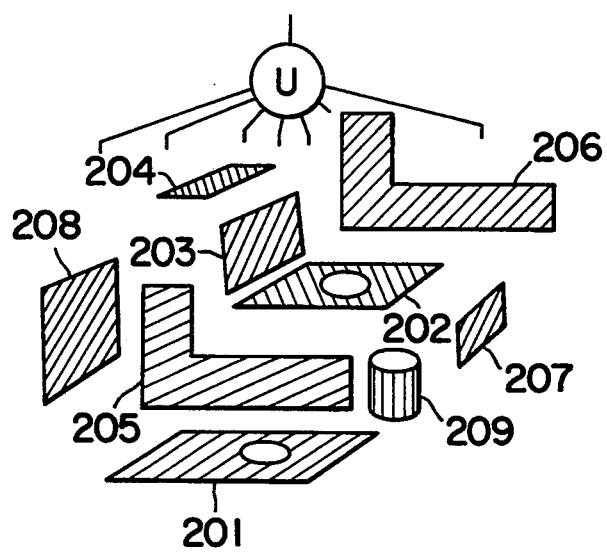
F I G. 9
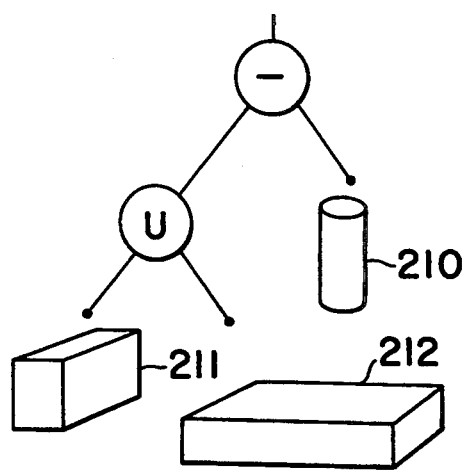
F I G. 11

| SHAPE DEFINITION |
| --- |
| SURFACE ATTRIBUTE DEFINITION |
| MACHINE TOOLS |
| FIXTURE |
| MACHINING METHOD |
| MACHINING SEQUENCE |
| TOOL |
| MACHINING CONDITION |
| TOOL PATH GENERATION |
| TOOL PATH SIMULATION |
F I G. 13A
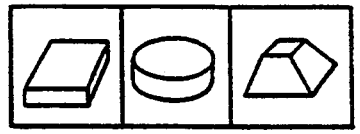
F I G. 13B

| PART | SUBPART | SEGMENT | ELEMENT |
|------|---------|---------|---------|
| TESTO I | SUB I | RCT I | |
| MODE | P | PATTERN CODE | |
| DOMAIN | | | |
| LOCATION | | | |
| DIMENSION | | | |

FIG. 13 I

| DIMENSION | |
|---|---|
| A | 274 |
| B | 50 |
| H | 60 |

FIG. 13 J

| ipn | MEANING | | ipn | MEANING | |
|---|---|---|---|---|---|
| 1 | FLAT SURFACE |  | 100 | RECTANGLE | 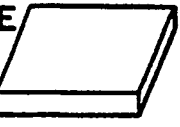 |
| 2 | CYLIN-DRICAL SURFACE |  | 200 | CYLINDER |  |
| 3 | CONICAL SURFACE |  | 300 | TRUNCATED PYRAMID | 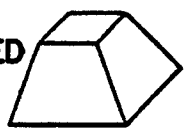 |
| 4 | SPHERICAL SURFACE |  | 400 | TRUNCATED CONE |  |
| 10 | CHAMFERING |  | 1000 | PROFILE |  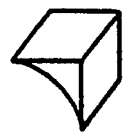 |
| 20 | CORNER | 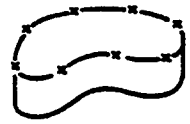 | | | |
| 30 | GROOVE | 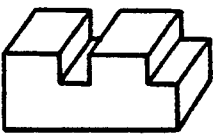 | 2000 | SPHERE |  |
| | | | 3000 | POLY-HEDRON | 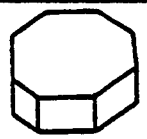 |
FIG. 16

| 1 SYSTEM CONTROL MODULE |
| --- |
| 2 SHAPE DEFINITION MODULE |
| 3 SURFACE ATTRIBUTE DEFINITION MODULE |
| 4 CONSTANT SETTING MODULE |
| 5 MACHINE TOOL DETERMINING MODULE |
| 6 FIXTURE/MOUNTING ATTITUDE |
| 7 MACHINING METHOD DETERMINING MODULE |
| 8 MACHINING SEQUENCE DETERMINING MODULE |
| 9 TOOL/TOOL HOLDER DETERMINING MODULE |
| 10 MACHINING CONDITION DETERMINING MODULE |
| 11 TOOL PATH GENERATION MODULE |
| 12 MACHINING TIME CALCULATION MODULE |
| 13 TOOL PATH SIMULATION MODULE |

F I G. 17

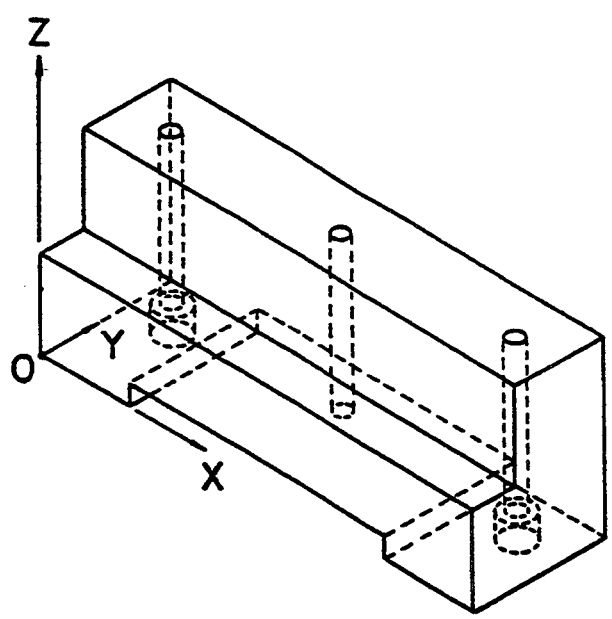

F I G. 18

INPUT DATA
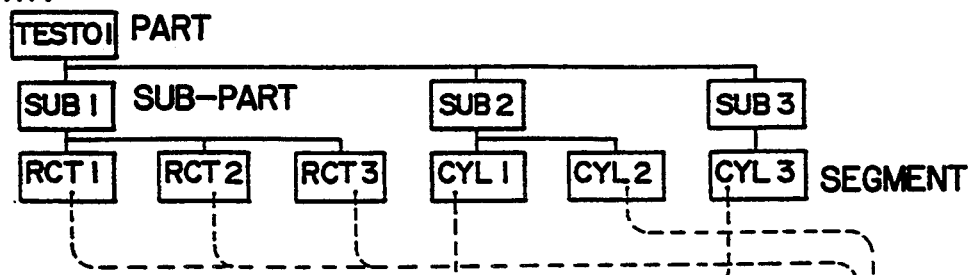
REGISTERED DATA
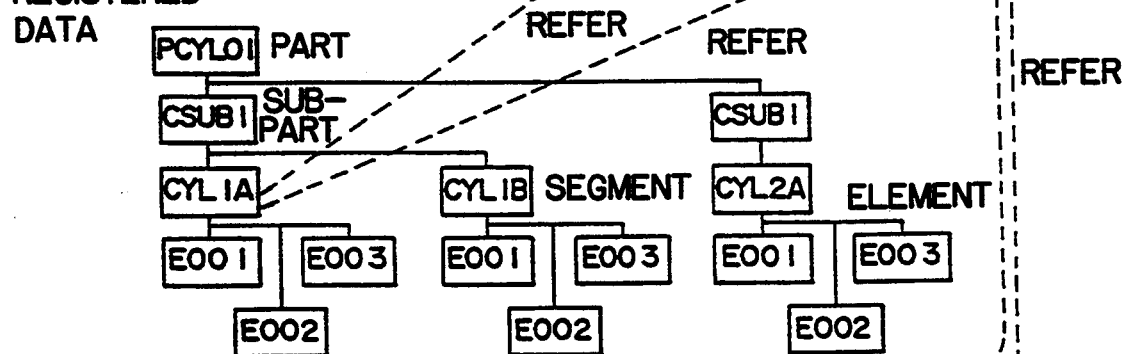
SHAPE DATA LIBRARY
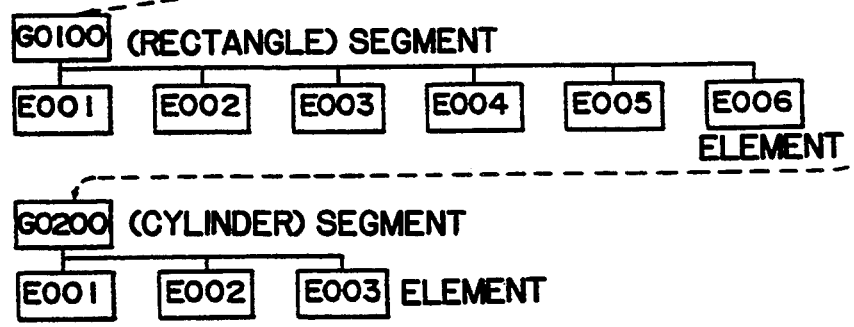
F I G. 23

FIG. 25M

| PART | SUBPART | SEGMENT | ELEMENT |
|------|---------|---------|---------|
| TEST 01 | SUB 1 | RCT 1 | |
| | | RCT 2 | |
| | | RCT 3 | |
| | | | |
| | | | |
| | | | |
| | | | |

| DOMAIN | |
|--------|--|
| X | |
| Y | |
| Z | |

| LOCATION | |
|----------|---|
| X | 35 |
| Y | 0 |
| Z | 0 |
| A | 0 |
| B | 0 |
| C | 0 |

| MODE |
|------|
| P |
| Q |
| D |
| FP |
| FQ |
| MP |
| MQ |

FIG. 25N

| PART | SUBPART | SEGMENT | ELEMENT |
|------|---------|---------|---------|
| TEST 01 | SUB 1 | RCT 1 | |
| | | RCT 2 | |
| | | RCT 3 | |
| | | | |
| | | | |
| | | | |
| | | | |

| DOMAIN | |
|--------|--|
| X | |
| Y | |
| Z | |

| LOCATION | |
|----------|---|
| X | 0 |
| Y | 0 |
| Z | 20 |
| A | 0 |
| B | 0 |
| C | 0 |

| MODE |
|------|
| P |
| Q |
| D |
| FP |
| FQ |
| MP |
| MQ |

| PART | SUBPART | SEGMENT | ELEMENT |
|---|---|---|---|
| TEST01 | SUB 1 | RCT 1 | |

| PART | SUBPART | SEGMENT | ELEMENT |
|---|---|---|---|
| TEST01 | SUB 1 | RCT 1 | |
| | | RCT 2 | |
| | | RCT 3 | |
| | SUB 2 | CYL 1 | |

| REFERENCE | |
|---|---|
| PART | PCYL01 |
| SUBPART | CSUB 1 |
| SEGMENT | CYL 1A |

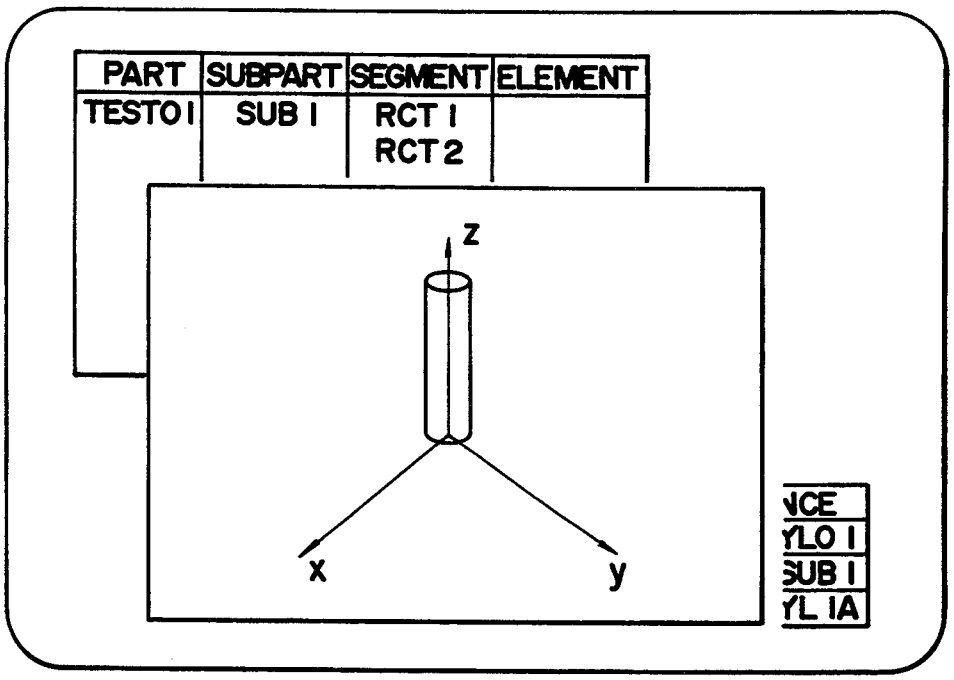
F I G. 25Q
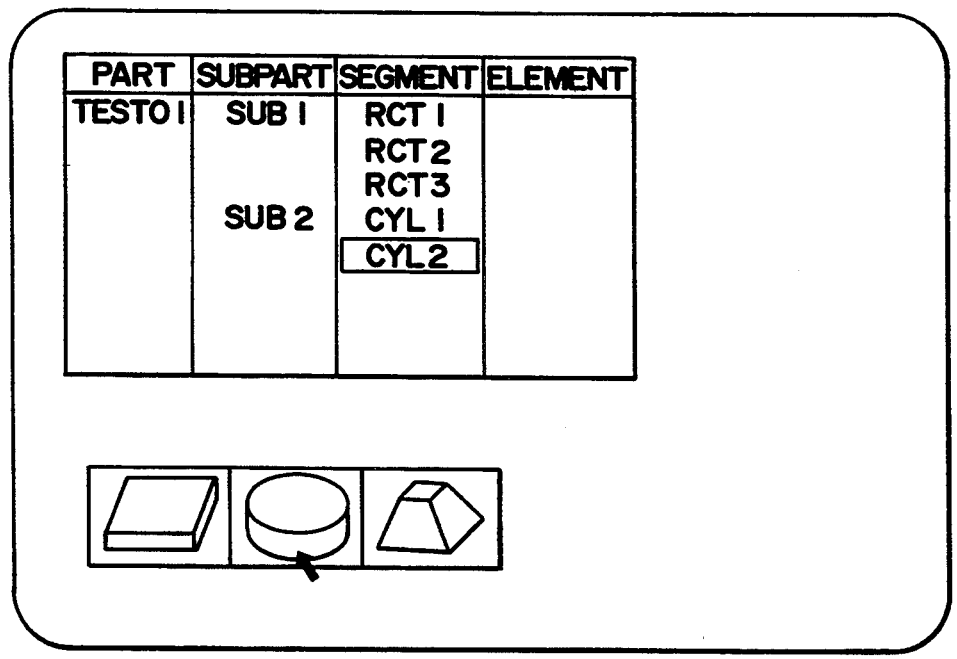
F I G. 25R

| PART | SUBPART | SEGMENT | ELEMENT |
|---|---|---|---|
| TEST01 | SUB 1 | RCT 1 | |

| PART | SUBPART | SEGMENT | ELEMENT |
|---|---|---|---|
| TEST01 | SUB 1 | RCT 1 | |
| | | RCT 2 | |
| | | RCT 3 | |
| | SUB 2 | CYL 1 | |
| | | CYL 2 | |
| | SUB 3 | CYL 3 | |

| REFERENCE | |
|---|---|
| PART | PCYL01 |
| SUBPART | CSUB 1 |
| SEGMENT | CYL 1A |

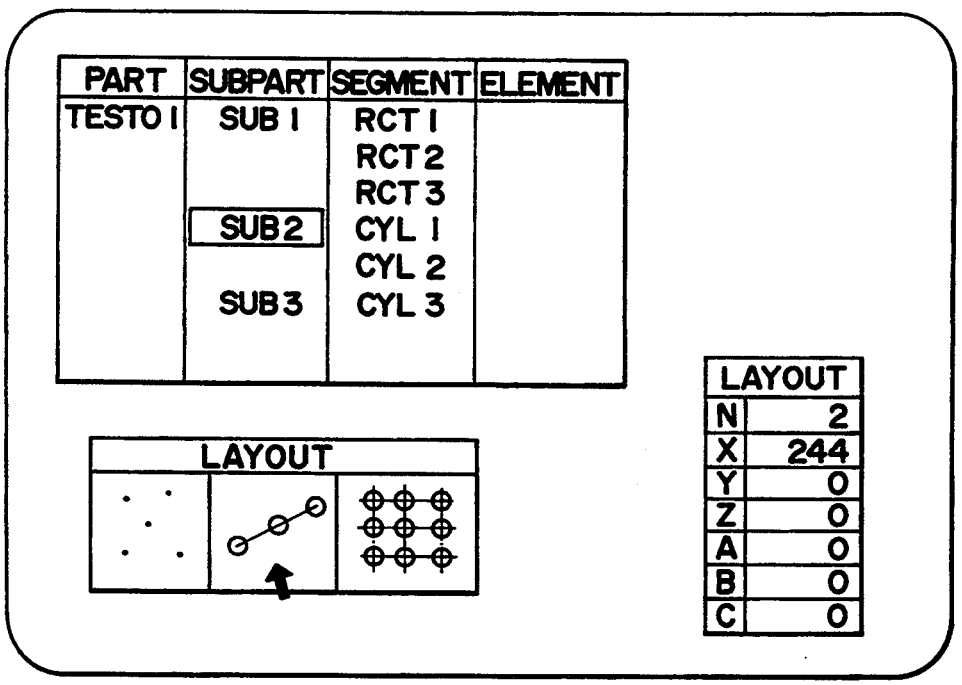
F I G. 25ZC
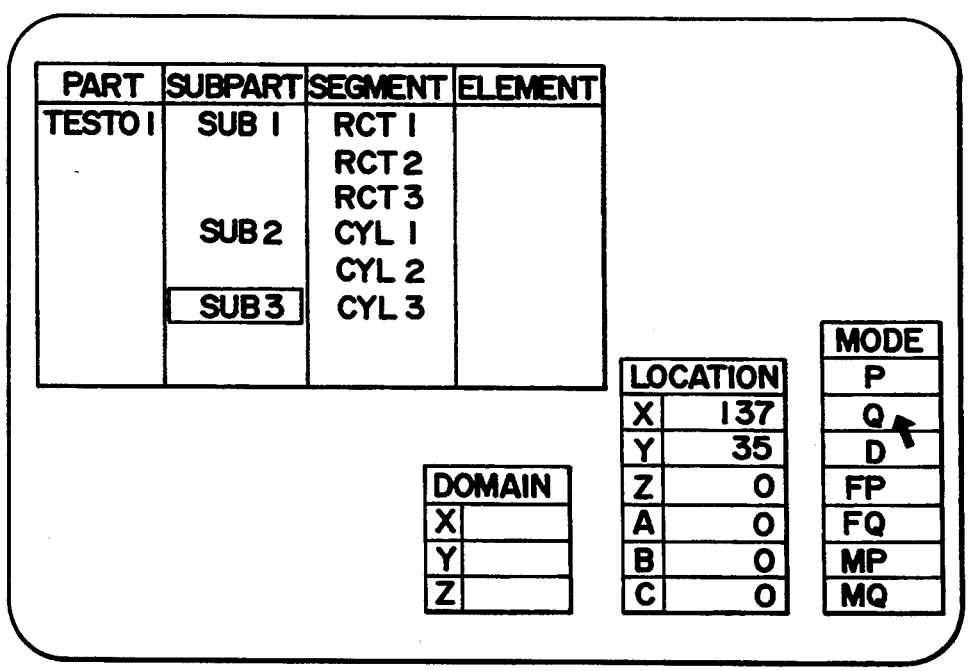
F I G. 25ZD

INTERACTIVE GRAPHIC INPUT SYSTEM

This is a continuation of application Ser. No. 639,141, filed Jan. 9, 1991, is now abandoned, which was a continuation of application Ser. No. 498,480, filed Mar. 23, 1990 now abandoned, which was a continuation of application Ser. No. 040,599, filed Apr. 20, 1987 now abandoned.

BACKGROUND OF THE INVENTION

This invention relates to a method for inputting shapes of three-dimensional solid models in CAD (Computer Aided Design) and CAM (Computer Aided Manufacturing) systems in an interactive operation, and more particularly to a method for defining shapes of primitives such as a plane, cube, column or sphere in a manner of building up blocks with a cursor on a graphic display unit to thereby enhance the efficiency in solid set operation and the operability of the input.

When a shape is to be defined in the prior art CAD or CAM system, the shape is generally expressed by combining several shapes which are simple enough to be expressed by mathematical formulas according to the principle of logical operation (set operation). However, in the dies machining, the process involves many shapes which cannot be expressed fully by mathematical formula alone. A complicated shape had to be expressed therefore, by a combination of two methods; i.e. the shape is partly expressed with simple shapes which can be expressed by mathematical formulas, and partly with free-formed-surfaces which can be difined by groups of points. Since it is difficult to use the conventional set operation for such a free-formed-surface, when a mixture of shapes which can be expressed by mathematical formulas and shapes which can only be expressed by the free-formed-surfaces are to be processed to generate data for machining, separate algorithms must be prepared. This presented inconveniences in the prior art.

When dies are machining utilizing the concept of CAD/CAM or mainly by NC (Numerical Control) machining, it is critical that the method has functions flexible enough to accommodate changes requested on spot by operators. In other words, the method should reflect the operator's practical know-how such as a change in the tool path. The system for machining shapes is, in short, required to satisfy the following conditions ① to ⑥.

① The function to define shapes should be fully separated from the function to generate tool paths.
② The processing method should allow to roughly define first the domain where a shape exists, and then define in minute detail the shape therein.
③ The shapes which can be expressed with mathematical expressions and the shapes which can only be expressed with free-formed-surfaces should be processed by a common processor.
④ The method should permit set operation of a combination of the above two types of shapes.
⑤ It should be easily connected to CAD system.
⑥ Its system software should be compact.

Studies are being promoted to adapt expressions with free-formed-surfaces in modeling in order to expand the functions of CAD which were originally developed for shape modeling. The method generally attempts to unify processing by discriminating the data structure on free-formed-surfaces, and recognizing them as B-Reps (Boundary Representation). However, the method using B-Reps cannot meet the above condition ② if CAM must perform set operation as a function because the data structure is more complicated and the processing is more cumbersome than CSG (Constructive Solid Geometry). In shape modeling, mathematical models for three-dimensional objects are built in a computer, modified to suit a requested shape, and expressed externally. Therefore, mathematical models should be prepared first by either one of the above two methods; i.e. CSG or B-Reps method. The CSG method builds solid shape models by constructing domains of closed point sets within a three-dimensional space with collection of half-space domains or one of the three-dimensional spaces which are divided by a free-formed-surface. B-Reps method, on the other hand, builds a solid shape model by supplying topological data of the points, edges, free-formed-surfaces, etc. of the object and geometric data on such elements of the topological relation as vertexes, edges and free-formed-surfaces, and creating closed two-dimensional manifolds within the three-dimensional space. Set operation can be conducted by comparing Z axes between primitives A and B as shown in FIG. 1, if considering practical condition in the shape machining, it is assumed that there is no processed shapes (shapes like an over-hang) of more than one value in the direction of the Z axis, and the domain where spaces exist is fixed from the boundary curved surfaces to the negative direction on the Z axis. More particularly, a desired shape can be obtained by selecting the maximum value of Z values in the case of union and the minimum value thereof in the case of product. But the method is not applicable to the processing of the shapes which are contradictory to the above assumption. Strictly speaking, the above method cannot realize the set operation. In the case of CSG method, as the data structure thereof is simple, high speed processing seems possible.

A free-formed-surface herein means a curved surface which cannot be expressed by a mathematical formula like $F(x,y,z)=0$. The surface has a group of points 2 as shown in FIG. 2 in the data structure, and if the space between points is interpolated by Coons or Bezier formula, the free-formed-surface 1 can be expressed in detail. Since free-formed-surfaces generally have complicated spaces, all the interpolation formulas to be used are the parameterized formulas. FIG. 3 shows a free-formed-surface 1 which is expressed in detail in a real space of XYZ coordinated interpolated with parameters in a parameterized space (uv coordinates). In other words, the free-formed-surface 1 is being expressed in parameterized space and cannot be recognized within a real space alone. If a free-formed-surface like this is added to CAD or CAM system as another element, it is necessary to investigate the relation with other elements such as sphere, plane or other surfaces which can be expressed with mathematical formulas. This obviously involves analysis in the real space. As stated above, because the method needs an expression out of the real space, a formidable difficulty is presented in handling free-formed-surfaces.

FIG. 3 also shows a view where the free-formed-surface 1 existing in the real space is mapped on the parameterized space, each boundary (edge) of the free-formed-surface 1 being in correspondence to each boundary of a rectangular domain 3 which indicates the free-formed-surface on the parameterized space. This relation results in the following phenomenon. As shown in FIG. 4, even if a linear interpolation is carried out on the parameterized space, it is inevitably expressed as distorted on the free-formed-surface. If this interpolation is on the tool path, pitches (pick feed) A and B of the tool on a real space cannot be set constant, but they fluctuate in width to seriously affect the machining efficiency. In the machining process, a specific domain A' may be designated for partial machining as shown in FIG. 5. But according to this method, designation of the domains cannot be clearly corresponded between the real space A' and the parameterized space A". The machining domain A' may be designated in the real space, but it cannot be (analytically) corresponded to the parameterized space A". When a curvature is extremely large as shown in FIG. 6 and if the conventional parameter interpolation is performed, the tool path TT in the left side of the figure will generate. But in practice, a different path TT' in the right side of the figure may be required. These different paths cannot be plotted by the conventional parameter interpolation.

FIG. 7 shows an embodiment of the conventional B-Reps method system.

If we imagine a solid object 200 as shown in FIG. 8, the data on the shape are inputted to a shape data input unit 10, are separated into boundary elements 201 through 209 of the solid as shown in FIG. 9 by predetermined processing procedures, and at the same time, they are separated further into structural data 21 which indicated the connections between elements and the mathematically expressible shape data 22 which indicate formulas of coordinates of vertexes, formulas of edges and formulas of faces. If the object 200 has a free-formed-surface, the free-formed-surface has the free-formed-surface data 23 which are expressible with groups of points and interpolated curved surfaces, but in this case, the free-formed-surface data 23 should always include the data on intersecting lines according to B-Reps method. The shape data 20 thus obtained are inputted to a mathematically expressible shape processing section 30 together with the data on machining information 31 such as a radius of a tool, feeding direction of a tool, cutting speed area to be processed in order to trace a data pointer. More particularly, according to B-Reps method, the boundary data of the shape elements are stored, and if the boundary is traced with dot information, it is possible to display (101) the path on screen of a display unit such as CRT, to generate (102) the NC tool path, or processing (103) mass properties on materials or sized. The B-Reps method is detrimental in that the number of data becomes enormous as the method separates a solid object into functions of boundaries, and shapes which geometrically are impossible to be defined or shapes which cannot exist three-dimension may be inputted by an erroneous input.

FIG. 10 shows the structure of an embodiment of the GSG method system in the prior art wherein data on shapes are inputted to a shape data input 10, and separated into structural data 21 and mathematically expressible shape data 22; those data included the information related to surfaces indicating boundaries. The solid object in FIG. 8 can be separated into shape elements (primitives) 210 through 212 in FIG. 11, and if the primitive 210 is subtracted from the union of the primitives 211 and 212, the solid shape 200 can be obtained. Since the CSG system needs functional information on boundaries, it cannot conventionally process free-formed-surface data, which is not included in the shape data 20. The shape data 20 are set to shape extracting processing section 40, and when the extracting processing section 40 is inputted with space information SP in accordance with processes 43 corresponding to applications such as display or generation of the tool path, it generates the shape information TS on the whole solid. More specifically, the mathematically expressible shape data 22 and the space information SP are synthesized at a mathematically expressible shape processing 41, and the the synthesized shapes SSP are in set-operation 42 with structural data 21 to thereby generate the shape information TS on the whole shape of the object. The shape information TS are processed (101) to be displayed on a screen, to generate (102) the NC tool path, to be processed (103) for mass properties, or to be processed (104) for surface intersecting operation. Simultaneously, application information S1 through S4 are outputted to indicate such processing on application and are converted into the space information SP at the processes 43. The conventional CSG method is detrimental in that it cannot be applied to a shape which includes free-formed-surfaces as it does not incorporate them within the stored shape data 20.

In the three-dimensional solid model definition according to the conventional CSG method, it is necessary to define individual elements on the whole coordinate system, and therefore it involves cumbersome steps to define such elements while checking the coordinate relation. Even if a shape is defined with the method, it is difficult to relocate it in the coordinate system to refer to the whole shape.

Since the conventional method displays only one image frame or merely changes the view points for an image frame, it was difficult to display a plural number of image frames which were not related to each other on the screen simultaneously due to the problems which frequently arose in screen segmentation or display speed. These plural frames were therefore not displayed at the same time in practice except in a few special cases. As the conventional method uses the language especially made for shape definition for input, numerical values should be inputted sequentially according to a predetermined grammer for defining a shape, presenting a formidable difficultly in imaging a shape, or inviting erroneous inputs.

SUMMARY OF THE INVENTION

The present invention was contrived to overcome aforementioned problems encountered in the prior art and aims at a method of defining a three-dimensional solid model in a CAD/CAM system which utilized merits of the conventional CSG method, but can express primitive component elements of solid model in a hierarchical structure so that respective elements have their own coordinate systems, and that an element in a higher order can relocated a lower element within the coordinate system.

Another object of this invention is to provide an interactive input system for graphics which can express component elements of a three-dimensional solid model in a hierarchical structure, display a plural number of image frames on the screen simultaneously, input dimensions and data on coordinate system by referring to necessary data, and define shapes in an interactive operation.

According to one aspect of this invention, for achieving the object described above, there is provided an interactive input system for graphics comprising a graphic display unit having the function to display plural image frames which are not related to each other at positions and in sizes designated on the display screen for defining the shapes of a workpiece, fixture, machine tool or tool or other environmental shapes in an NC automatic programming system or an NC simulation system, and a tablet or a mouse unit which specifies an arbitrary position on the display screen of said graphic display unit with a cursor, which is characterized in that image frames which are necessary to define a shape are consecutively displayed on a screen at a designated position and in size, and the necessary items can be selected with said cursor to define the shape of a given object.

According to another aspect of this invention, there is provided a method for defining shapes of three-dimensional solid model in CAD/CAM systems which is characterized in that component elements of the three-dimensional solid model are expressed in a hierarchical structure mainly of two-layered structure repesented by union and product, and the shape is defined by a set operation of the component elements by using a CSG defining method.

The nature, principle and utility of the invention will become more apparernt from the following detailed description when read in conjunction with the accompanying drawings.

BRIEF DESCRIPTION OF THE DRAWING

In the accompanying drawings:

FIGS. 4 through 6 are graphs to explain the relation between a real space and a parameter space;

FIG. 8 is a view to show an example of a solid shape;

FIGS. 9 and 11 are exploded views of the solid shape shown in FIG. 8, respectively;

FIG. 16 is examples of segments;

FIG. 17 is types of software to be used in the system according to invention;

FIG. 18 is an example of three-dimensional solid shapes;

FIGS. 23 and 24 are specific examples thereof; and

DESCRIPTION OF THE PREFERRED EMBODIMENTS

The CSG method is advantageous in that the structure is simple, the volume of necessary data is small, input or modification of the data is easy and the data can be read easily. Since the method processes primitives as they are, it is easy to grasp characteristics of a shape. This invention method attempts to utilize such advantageous features of the CSG method in interactive shape definition.

Figure 1:
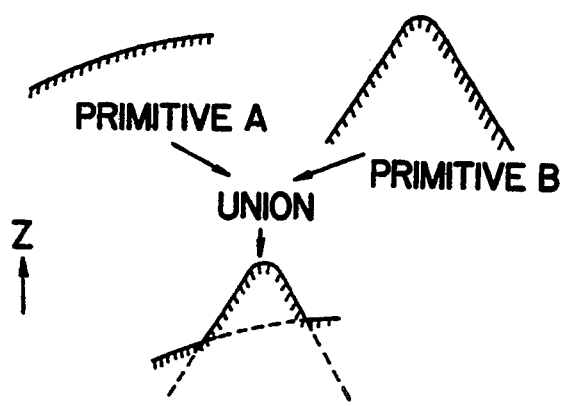
FIG. 1 is a view to explain a general set operation for a two-dimensional shape.
Figure 2:
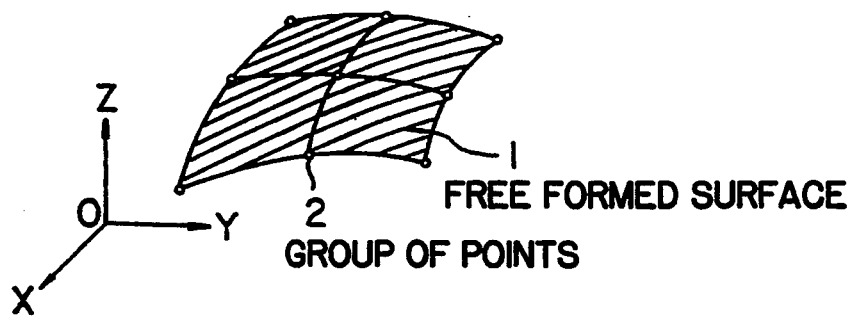
FIG. 2 is an example of expression of a free-formed-surface with the groups of points.
Figure 3:
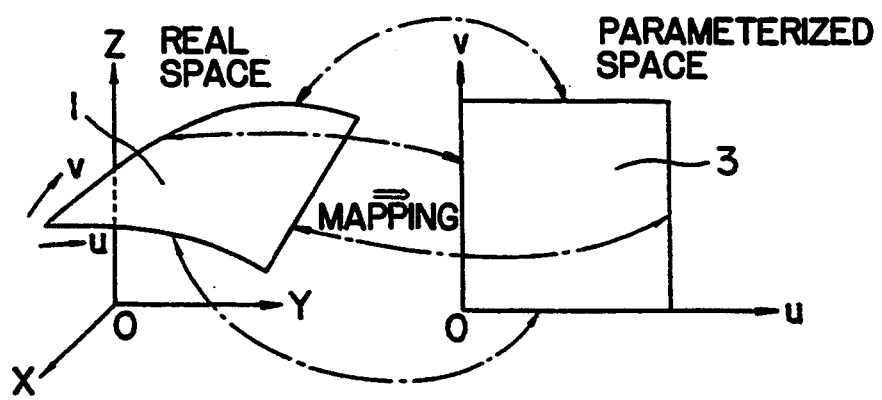
FIG. 3 is a view to show the relation between a real space and a uv parameter space.
Figure 7:
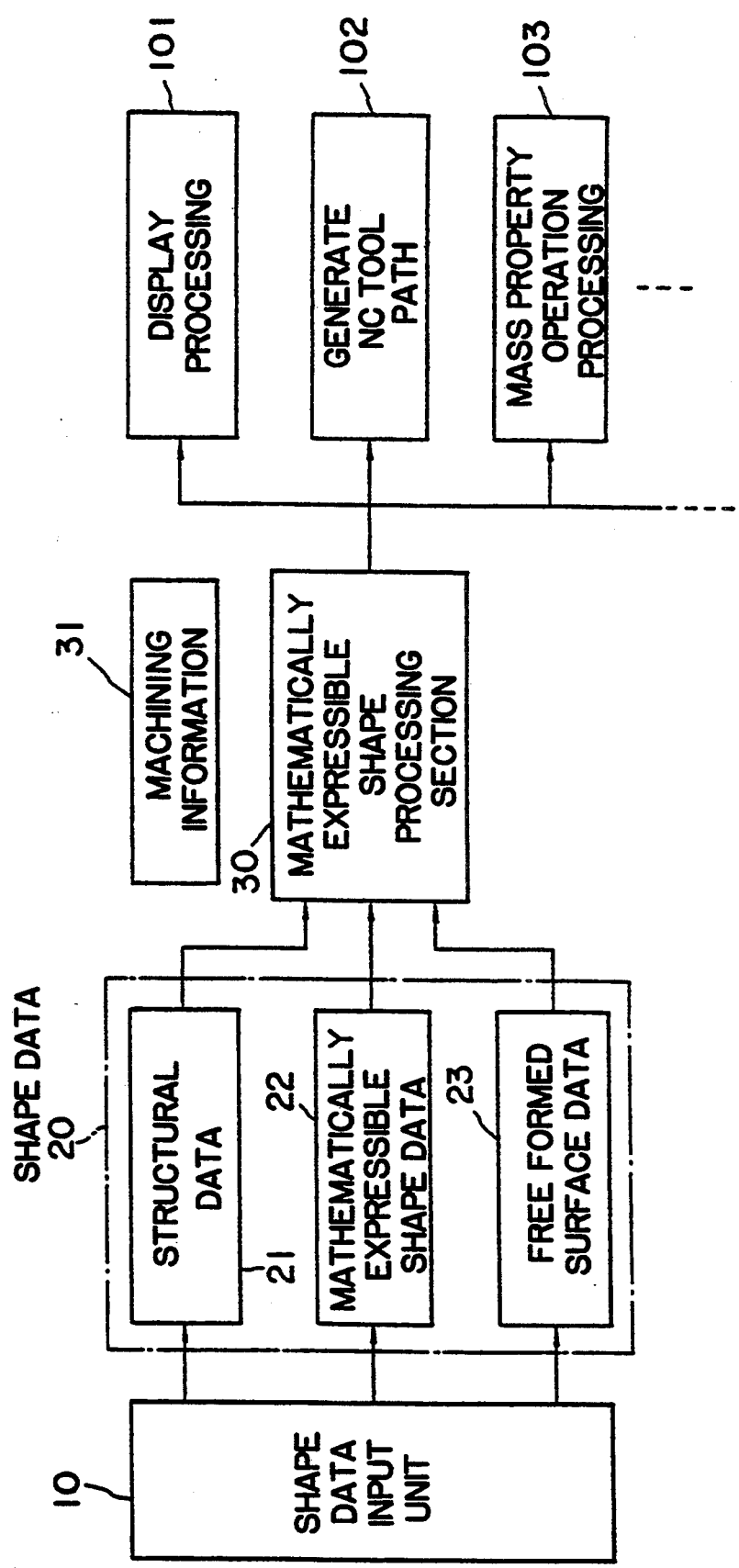
FIG. 7 is a block diagram to show a conventional-system with B-Reps method.
Figure 10:
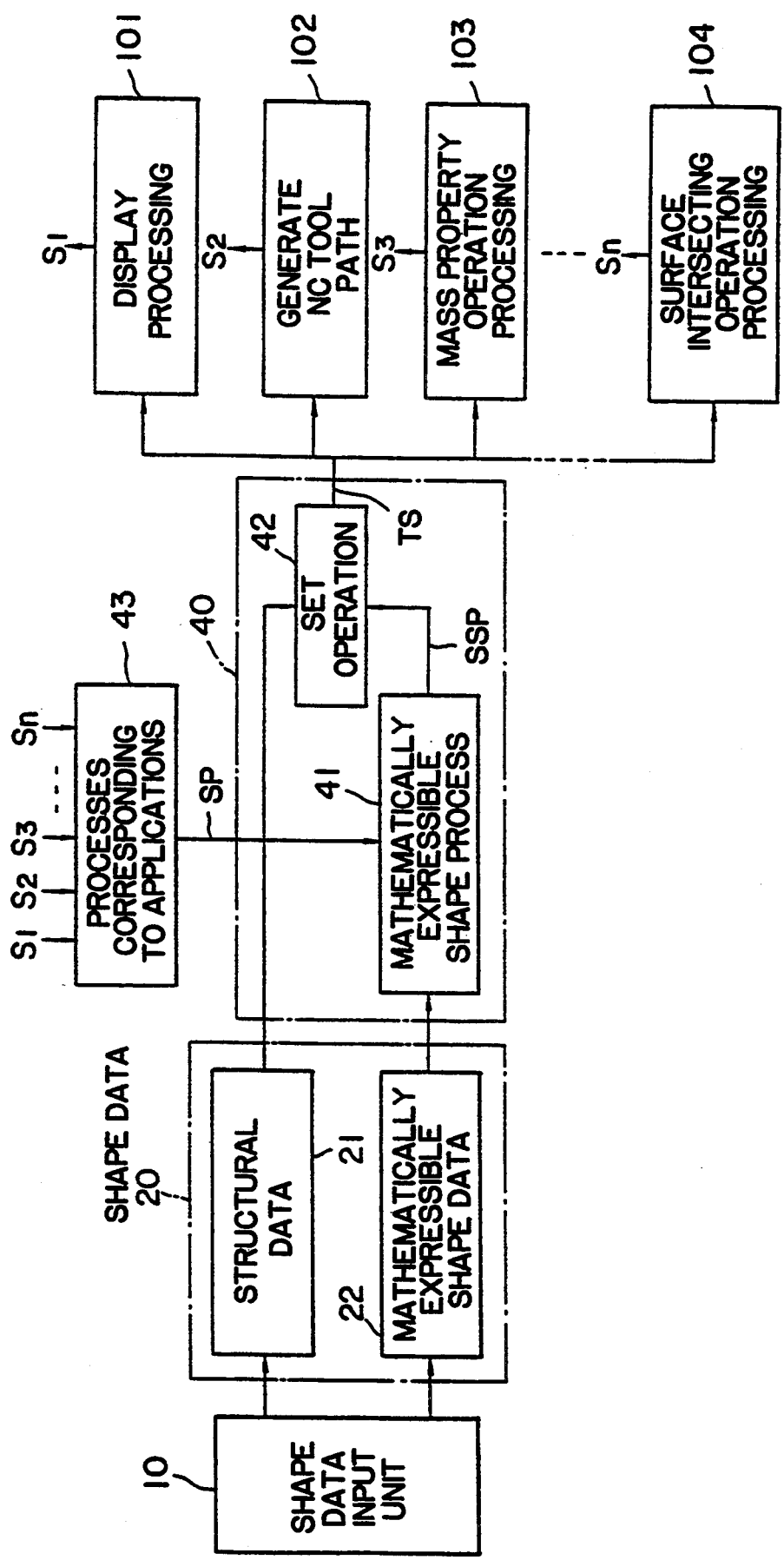
FIG. 10 is a block diagram to show a conventional system with CSG method.
Figure 12:
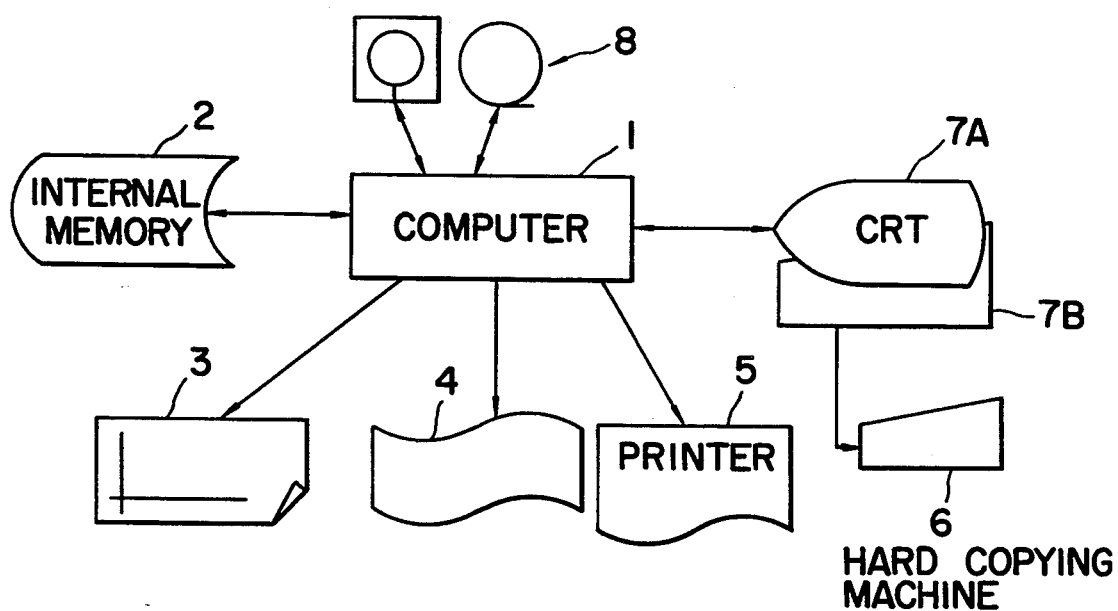
FIG. 12 is a block diagram to show the whole structure of this invention system.

FIG. 12 shows the whole structure of this invention system; wherein internal memory 2 such as a hard disc is the unit to store data which are used in the system while external memories 8 such as a floppy disk or magnetic tape are units to save data in the internal memory 2 or to restore the data therein at the internal memory 2. A display unit 7A such as a CRT displays characters, graphics or shapes for interaction with users, an input unit 7B such as a keyboard is a unit from which users give commands to the system, and a hard copying machine 6 prints the content of the display unit 7A on sheets of paper. A plotter unit 3 outputs graphic data such as flow charts by plotting, a paper tape unit 4 punches NC tapes or reads data in NC tapes, and a printer 5 outputs documents in print.

Figure 13C:
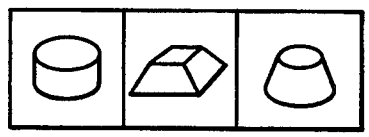
FIGS. 13A through 13K are views showing examples of display frame according to this invention, respectively.
Figure 13D:
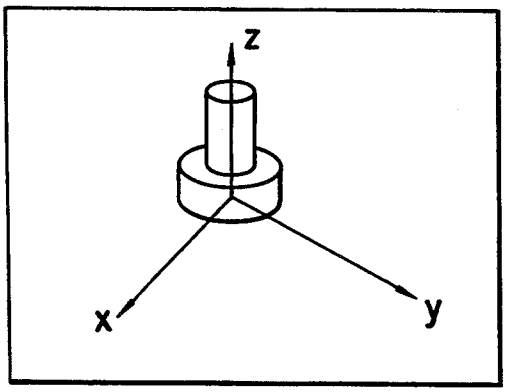
Figure 13:
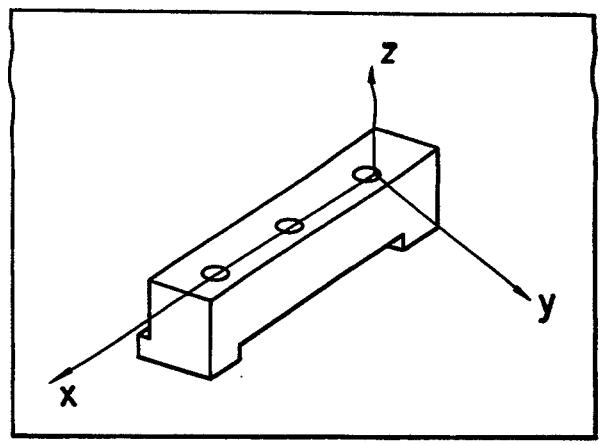
Figure 13:
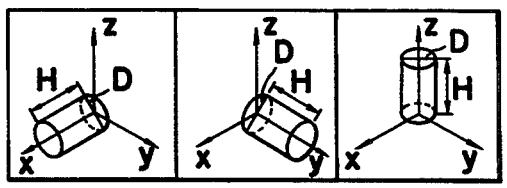
Figure 13G:
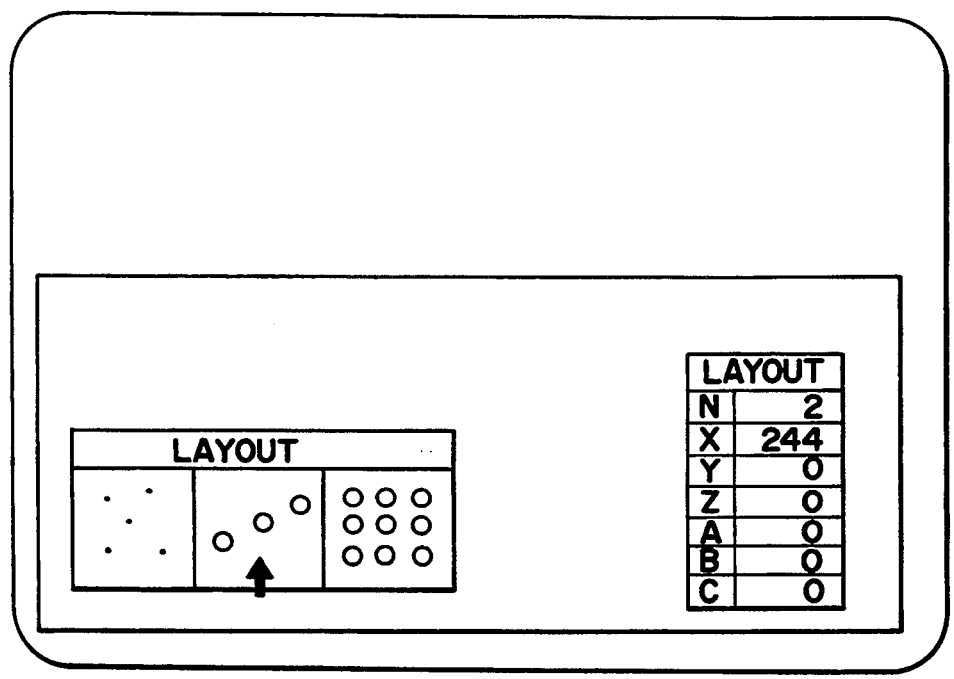
Figure 13H:
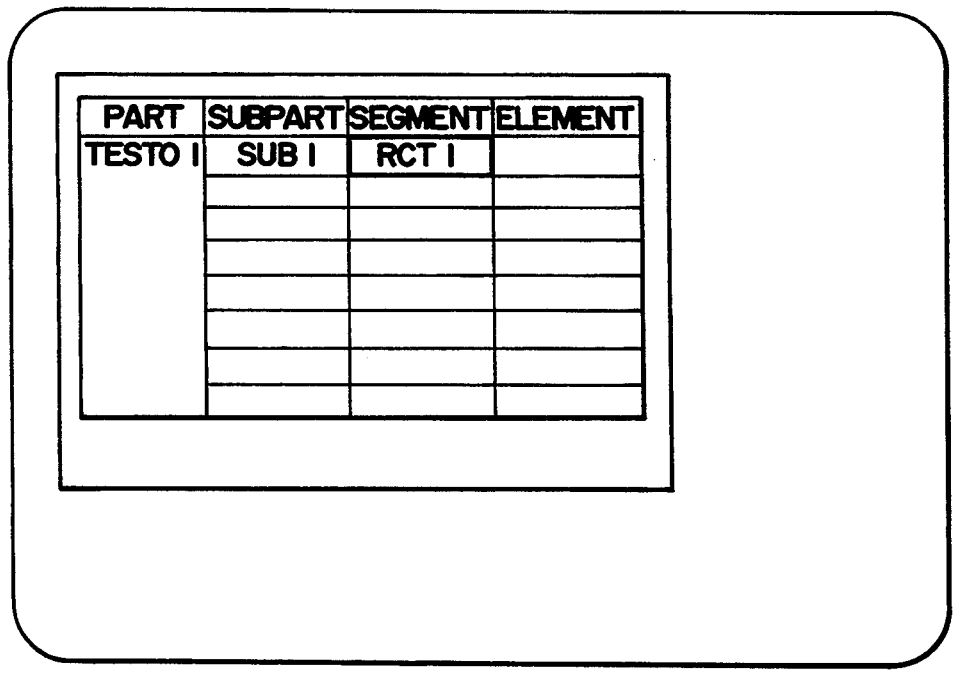
Figure 13K:
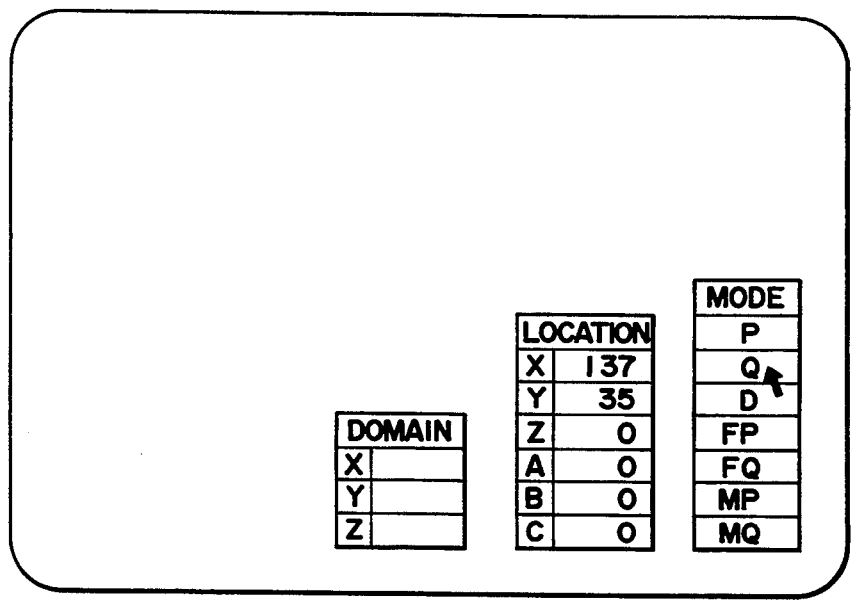

The display unit 7A according to this invention displays a menu from which works necessary for defining shapes or attributes can be selected (FIG. 13A). The menu shown in FIG. 13B is an example of the menu from which primitives can tie selected. If the screen is scrolled by one line to the left, the screen will become what is shown in FIG. 13C. FIG. 13D shows an example of the displayed screen with the shapes of parts defined by combination of the primitives, and FIG. 13E shows an example of the displayed screen of a product shape defined by combination of part shapes. FIG. 13F shows a menu from which a coordinate can be selected. FIG. 13C shows a menu from which layout pattern can be selected to determine the layout. FIG. 13H shows a displayed screen of a data structure which will be described hereinafter. FIG. 13I shows a screen displaying attributes such as primitives, part shapes and product shapes. FIGS. 13J and 13K show an example of supporting frames to which dimensions, layout and mode necessary for defining a shape can be inputted. Since this invention method displays a plural number of frames simultaneously on the same screen, the screen size should be large enough to offer a good and easy view to users. The screen can therefore be scrolled in vertical and horizontal directions.

Figure 14:
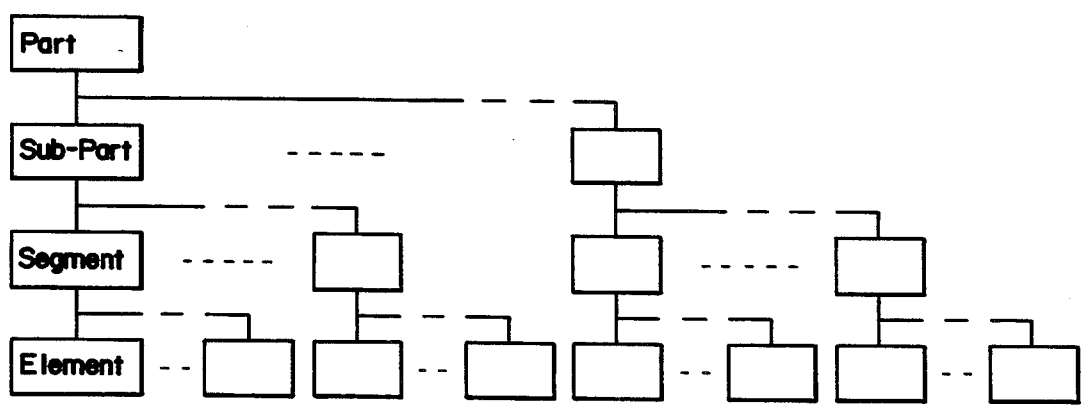
FIG. 14 is an example of the data structures according to this invention.
Figure 15A:
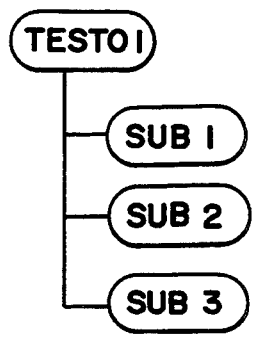
FIGS. 15A through 15D are views simulating the data structures.
Figure 15B:
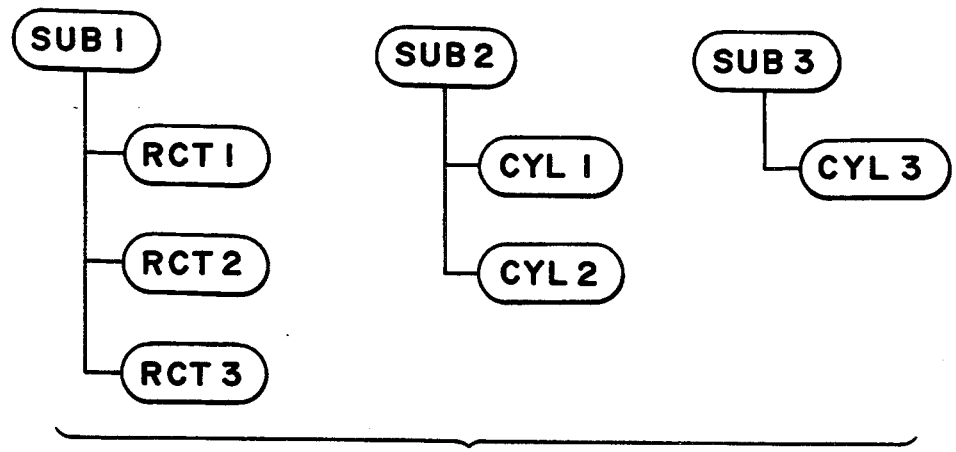
Figure 15C:
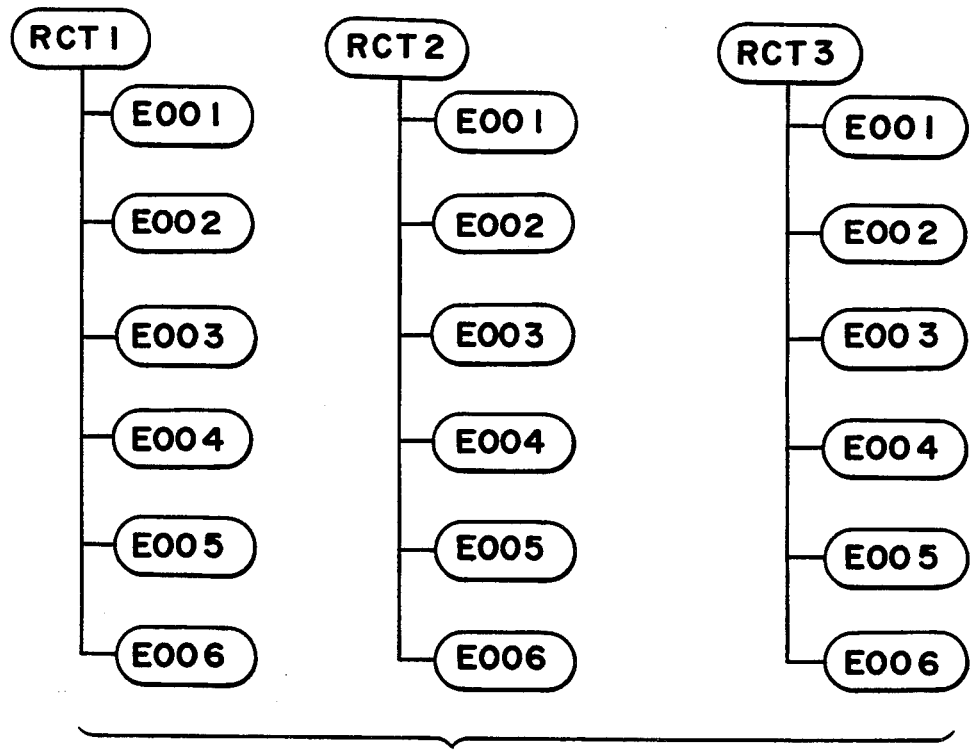
Figure 15D:
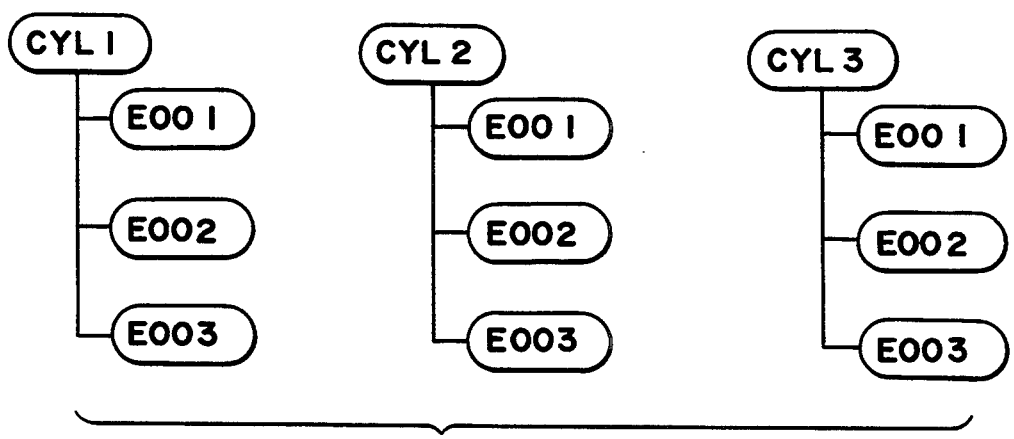

The input data in this system are structured in a hierarchy comprising parts, subparts, segments and elements as shown in FIG. 14. A part is a set of subparts and indicates the total of shape data within a domain, a subpart is a set of segments and indicates partial shapes which are used to express a part, and a segment indicates three-dimensional primitives to be used for expressing a subpart. A segment is a product set of elements which has been made directional to form a half space. An element indicates a flat surface or a quadratic surface which are used to express a segment. FIGS. 15A through 15D show models of input data in hierarchy. FIG. 15A shows the definition by a part, FIG. 15B the definition by a subpart, and FIGS. 15C and 15D the definitions by a segment and an element respectively. Specific data arrays are as follows:

```
Definition of a part;
  >>*PART name of a part (location) [domain]
    >>*SUBPART name of a subpart [.EQ.
      Reference-name][domain]
    >>*E SUBPART (location) imd [,layout [: name of group]]
    .
    .
  >>*E PART
Definition of a subpart;
  >>*SUBPART name of a subpart
    >>*SEGMENT name of a segment [.EQ.
      Reference-name] [domain]
    >>*E SEGMENT (location) imd [,layout [: name of a group]]
    .
    .
  >>*E SUBPART
Definition of a segment;
  (a) In the case of a menu segment
    >>*SEGMENT name of a segment, ipn, idm (dimension)
    >>*E SEGMENT
  (b) In the case of general segments (including profiles
    and polyhedrons)
    >>*SEGMENT name of a segment [, ipn]
      >>*ELEMENT name of an element ipm, idm (dimension)
        .EQ. Reference-name
      >>*E ELEMENT (location) isd [, imd]
      .
      .
  >>*E SEGMENT
Definition of an element;
  >>*ELEMENT name of an element ipn, idm (dimension)
    EQ. Reference-name
  >>*E ELEMENT (location) isd [,imd]
```

Location is means to rotate or translate points on a local coordinate system and is expressed in (x,y,z,a,b,c). The alphabetical letters "a,b,c" mean rotational angles around respective axes. Domain defines a space for definition, and is expressed by the minimum and maximum values for axes respectively. When not instructed, the system automatically set the minimum domain, imd means a mode code which is classified into a standard mode code and an option mode code.

(a) Standard Mode Codes:

P mode→The mode means to allow the particular element to be present.

Q mode→The mode means to delete the element.

D mode→This is a supplementary definition necessary to define other elements. The mode is regarded not to exist.

FP mode→The mode means to assure the particular element is constantly in P mode, and not to be affected by the modes of subsequent elements even if the element shares common portions spatially with those elements.

FQ mode→The mode means to assure the particular element is constantly in Q mode and not to be affected by the modes of subsequent elements even if the element shares common portions spatially with those elements.

(b) Option Mode Codes:

They have meanings on the side of application.

MP mode→This mode means to generate the tool path for an element of P mode by a method other than the scan-line-method and the contouring method.

MQ mode→This mode means to generate the tool path for an element of Q mode by a method other than the scan-line-method and the contouring method.

Layout [: Name of Group] and "Layout" supplies information in positional arrangement when plural subparts and segments are to be arranged. The name of a group is the name which is used for generally referring the shape generated by the "Layout" to the original shape. They are typically translation, rotation, arrangement at a uniform interval on linear lines, lattices, quadrilaterals, circumferences, equiangular distribution on archs, unequal distribution on circumferences, etc. Those shapes which are arranged by the "Layout" or the shape referred to (or the original shapes) can be grouped under a common name. ipn (pattern code) is a code given to elements or segments white idm (dimension code) is to give a direction for sweeping two-dimensional shapes and forming three-dimensional solid shapes.

1 ... the direction of X axis
2 ... the direction of Y axis
3 ... the direction of Z axis
4 ... direct instruction of a three-dimensional solid shape "Reference-name" is used to designate the data which are referred to as a subpart, segment or element. There are three ways of disignation.

(1) When referred to as a subpart:
  ① /subpart name ... Refer to a subpart which is expressed by the subpart name within its own part or within the registered data.
  ② part name/subpart name ... Refer to a subpart which is expressed by the part name/subpart name within the registered data.
  ③ part name ... Refer to all the subparts of the part which is expressed by the part name within the registered data.

(2) When referred to as a segment:
  ① //segment name ... Refer to segment which is expressed by the segment name within its own part and its own subpart.
  ② /subpart name/segment name ... Refer to a segment which is expressed by the subpart name/segment name within its own part or the registered data.
  ③ part name/subpart name/segment name ... Refer to a segment name which is expressed by the part name/subpart name/segment within the registered data.
  ④ /subpart name ... Refer to all the segments which are expressed by the subpart name within its own part or registered data.
  ⑤ part name/subpart name ... Refer to all the segments of a subpart which are expressed by the part name/subpart name within the registered data.

(3) When referred to as an element;
  ① //segment name ... Refer to all the elements of a segment which is expressed by the segment name within its own part and its own subpart.
  ② /subpart name/segment name ... Refer to all the elements of the segment which is expressed by a subpart name/segment name within its own part or within the registered data.
  ③ part name/subpart name/segment name ... Refer to all the elements of the segment which is expressed by the part name/subpart name/segment name within the registered data.

FIG. 16 shows as example of such a pattern code (ipn).

The computer 1 incorporated in the system shown in FIG. 12 has software including functional modules, functional tools and utilities where in a functional tool is a support tool so that each of the functional modules (which will be described hereinafter) may fully achieve the function, and the utilities are the programs which are used for debugging or maintenance. Functional modules are provided with the functions listed in FIG. 17 and are a presence independent from each other. When there are not sufficient information for execution, they execute under the following conditions auto-matically whenever necessary;

(1) It processes the data within possible scope with given information alone.
(2) It further generates additional information by the intervention of a user.
(3) It terminates the processing with the intervention of a user. Each of the functional modules will be described in the followings:

The system control module displays a top menu on the terminal, executes the processing which a user selected out of the top menu and designated from-the terminal, and checks the user identification name and the step name. The system control module has a function to input the user identification name from the terminal and to examine his/her authenticity, a function to register a name of a new user and to prepare the environment for the new name, a function to display the top menu on the screen of a terminal, a function to execute processing designated from the terminal, a function to input the step name from a terminal and to examine its authenticity, and a function to register the name of a new step and to prepare the environment for the new step name.

The shape definition module defines a shape and outputs the information on the shape to a data file. The data file to which the data is sent is determinable with the user identification names and types of shapes. The shape definition module has a function to define the shape of a product, a function to define the shapes of workpieces, a function to define the shapes of machine tools, a function to define the shapes of tools, a function to define the shape of fixtures, a function to control the output of the shape data when defined shapes are stored, and a function to use utility functions which the shape definition module possesses.

The surface attribute definition module gives information on surfaces of a shape by receiving the shape information from the data file, and output them to the data file again. This is the function to designate such attributes on surfaces as relative roughness on a finished surface or the reference surface.

The constant setting module gives constants to the basic data items which are necessary for processing of this system and outputs them to a process planning file. Similarly, the process planning file is supplied with the information on selected workpieces from the workpiece setting function, and the information on selected cutting fluids by the cutting fluid setting function.

The machine tool determining module chooses the optimal machine tool out of the machine tools registered in the machine tool master file, and has a function to select candidate machines out of the master file based on the data on workpiece shapes, a function to receive informations of a shape necessary for selection from the terminal when there are no data on the workpiece shape, and a function to finally select one machine tool out of the candidates by designating the one from the terminal. The function to select one machine tool outputs the information on selected machine tool to the process planning file as the information on the machine tool.

The fixture and mounting attitude determining module has a function to select the optimal fixture out of the fixtures registered in the fixture master file by designation from the terminal, and outputs the information on selected fixture to the process planning file. It also has a function to determine the mounting attitude by designation from the terminal, and outputs the information on determined mounting attitude to the process planning file as the information on the mounting attitude. It also has a function to display the state of the workpiece with the fixture, and outputs charts of mounting attitude of the workpiece with the fixture and the chart to correspond the workpiece and product.

The machining method determining module designates the combination of machining method and machining process and selects the machining patterns from the machining method master file. It also designates the set of machining surfaces by the combination of the method and processes. Even if a surface is an object of machining, it is not subject to machining when it is riot included here in the set of machining surfaces. The module has a function to designate from the terminal the combination of the method and process, a function to designate from the terminal the set of machining surfaces by the designated combination of method and process, and a function to modify the selected machining pattern.

The machining sequence determining module determines the order of machining for the unit of surface set judging from the method and the surface set. This machining sequence determing module has a function to receive the information on the priority order from the machining sequence master file and classify the orders by the unit of machining surface set, a function to correct the order if it is instructed to correct it, and a function to modify the order by the unit of machining surface set.

The tool/tool holder determining module has a function to select necessary tools and tool holders from the tool master file based on the process data, and retrieve candidates of tools and tool holders from the master file judging from the machining method, process (tools are uniformly determined by this process), surface set and order, a function to modify the dimensions or shapes of the selected tools and tool holders and a function to select a tool. The tool selection function is classified into two:

Automatic selection: The function to select tools and tool holders from candidates in accordance with a predetermined rule.
Manual selection: The function to designate from the terminal an optimal tool out of candidates and select the corresponding holders.

The machining condition determining module determines the condition for machining based on the process data. This machining condition determining module has a function to calculate the conditions for each machining method based on the process data, a function to input the conditions from the terminal and a function to modify the conditions from the terminal if necessary.

The tool path generation module generates the tool path needed to obtain the shape of a product based on the shape information of the shape data file. In generating the tool path, it refers to the information in the process planning file and the process data file. After generating such a tool path, it outputs NC data which has been compiled for the object machine tool to the NC data file. This module has a function to generate tool path for roughing as well as finishing, and to determine the cutting depth on a finished surface based on the desired roughness in a manner to leave the workpiece in the depth corresponding to the cutting depth at finishing process. The tool path for finishing is generated to obtain the final shape of the product by referring to the necessary information of the process planning file, and process data file by receiving them as input. It also has a function to avoid collision within a given domain while generating the tool path and a function to compile the information for NC machining for the object machine tool with the information obtained from the process planning file and process data file.

The machining time calculation module receives NC machining information from the NC data file and calculates the time required for machining. This module has a function to calculate time for each tool, a function to calculate rapid traverse time with accelaration/decelaration of rate in rapid traverse of the spindle, a function to calculate the time for tool change, a function to calculate the time for approaching and a function to calculate the time for table indexing.

The tool path simulation module receives NC machining information from the NC data file and simulates the movements of the machine tools. Simulation is performed as animation display on a color screen. This module has a function to check whether or not the input NC data can be corrected on the color screen, a function to simulate NC machining on the color screen, and function to compile from the terminal the NC machining information on the NC data file.

The hierarchical structure of input data will now be explained by referring to a concrete shape.

Figure 19A:
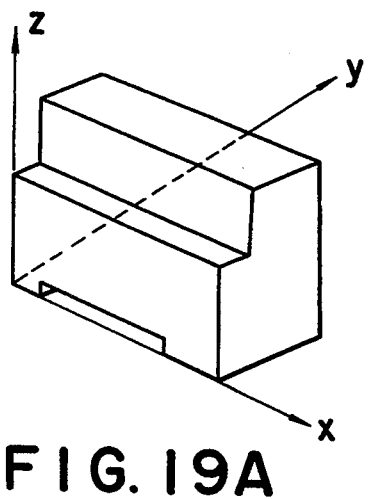
FIGS. 19A through 19C, FIGS. 20A-C, and FIGS. 21A and 21B are explanatory views of the hierarchical structure of data on a specific shape.
Figure 19B:
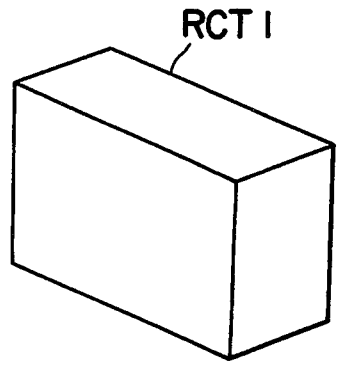
Figure 19C:
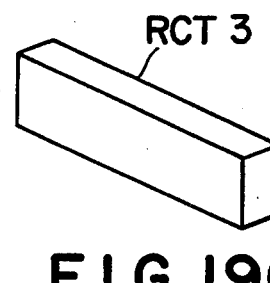
Figure 19D:
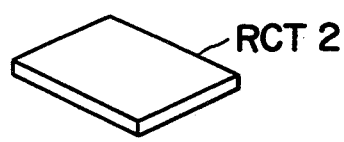
Figure 20A:
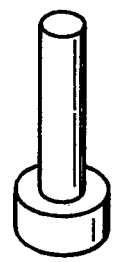
Figure 20B:
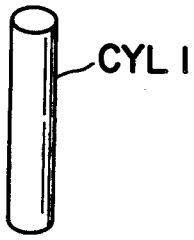
Figure 20C:
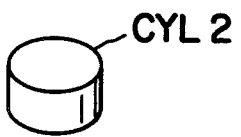
Figure 21A:
Figure 21B:
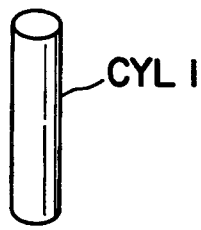
Figure 22:
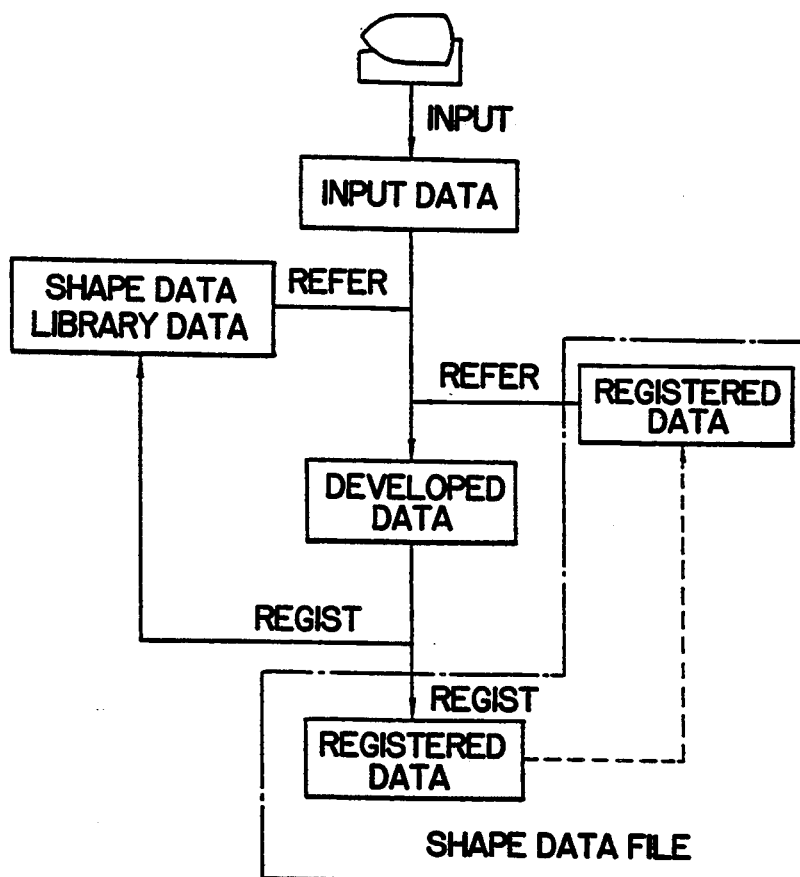
FIG. 22 is a view to show the relation among the input, registration and development of the data according to this invention.

FIG. 18 shows a three-dimensional solid model as an example. The model is obtained by subtracting the model shown in FIG. 20A at two locations and the model shown in FIG. 21A at one location from the model shown in FIG. 19A. The model shown in FIG. 19A is obtained by subtracting the model shown as RCT3 in FIG. 19C and the model RCT2 shown in FIG. 19D from the model RCT1 shown in FIG. 19B. According to this invention method, the model shown in FIG. 19A is registered as a subpart 1, and RCT1 through RCT3 are registered as segments respectively. The solid model shown in FIG. 20A is obtained by adding the model CYL1 of the FIG. 20B and the model CYL2 of FIG. 20C. The solid model in FIG. 20A is registered as a subpart 2, CYL1 and CYL2 as segments respectively. Further, the solid model in FIG. 21A is registered as a subpart 3, and the model CYL1 in FIG. 21B which is identical to the one in FIG. 20B as a segment. The data structure can be simplified by building up shape data in hierarchy. FIG. 22 showns the relation among input data, registered data and developed data. The input data, registered data, developed data and data in shape data library on the shape model shown in FIG. 18 are shown below:

| Input Data |
| --- |
| >>\*START |
| \* OIL TRAP 1 PART-3 SUBPART |
|   ( CASE 1 U-MDL1 ) \*\*\*\*\*\*\* |
| >>\*PART TEST01 ( ) |
|     >>\*SUBPART SUB1 |
|     >>\*E SUBPART ( ) P |
|     >>\*SUBPART SUB2 |

| -continued |
| --- |
|     >>\*E SUBPART ( 15, 35 Q, ) 2( 244, 0, 0, 0, 0, 0, 2 ) :HOLE |
|     >>\*SUBPART SUB3 |
|     >>\*E SUBPART ( 137, 35 ) Q |
| >>\*E PART |
| >>\*SUBPART SUB1 |
|     >>\*SEGMENT RCT1 |
|     >>\*E SEGMENT ( ) P |
|     >>\*SEGMENT RCT2 |
|     >>\*E SEGMENT ( 35 ) Q |
|     >>\*SEGMENT RCT3 |
|     >>\*E SEGMENT ( 0, 0, 20 ) Q |
| >>\*E SUBPART |
| >>\*SUBPART SUB2 |
|     >>\*SEGMENT CYL1. EQ. PCYL01/CSUB1/CYL1A |
|     >>\*E SEGMENT ( ) P |
|     >>\*SEGMENT CYL2 |
|     >>\*E SEGMENT ( ) P |
|     >>\*E SUBPART |
| >>\*SUBPART SUB3 |
|     >>\*SEGMENT CYL3. EQ. PCYL01/CSUB1/CYL1A |
|     >>\*E SEGMENT ( ) P |
| >>\*E SUBPART |
| >>\*SEGMENT RCT1, 100, 3( 274, 50, 60 ) |
| >>\*E SEGMENT |
| >>\*SEGMENT RCT2, 100, 3( 204, 50, 12.5 ) |
| >>\*E SEGMENT |
| >>\*SEGMENT RCT3, 100, 3( 274, 10, 40 ) |
| >>\*E SEGMENT |
| >>\*SEGMENT CYL2, 200, 3( 15, 12.5 ) |
| >>\*E SEGMENT |
| >>\*END |

| Registered Data |
| --- |
| >>\*START |
| \* CYLINDER PARTS SET |
| >>\*PART PCYL01 ( ) |
|     >>\*SUBPART CSUB 1 |
|     >>\*E SUBPART ( ) P |
|     >>\*SUBPART CSCB2 |
|     >>\*E SUBPART ( 20 ) P |
| >>\*E PART |
| >>\*SUBPART CSUB1 |
|     >>\*SEGMENT CYL1A |
|     >>\*E SEGMENT ( ) P |
|     >>\*SEGMENT CYL1B |
|     >>\*E SEGMENT ( 0, 50 ) P |
| >>\*E SUBPART |
| >>\*SUBPART CSUB2 |
|     >>\*SEGMENT CYL2A |
|     >>\*E SEGMENT ( ) P |
| >>\*E SUBPART |
| >>\*SEGMENT CYL1A, 200, 3( 10, 60 ) |
|     >>\*ELEMENT E001, 1, 3( 20, 20 ) |
|     >>\*E ELEMENT ( −10, −10 ) 1 |
|     >>\*ELEMENT E002, 1, 3( 20, 20 ) |
|     >>\*E ELEMENT ( −10, −10, 60 ) −1 |
|     >>\*ELEMENT E003, 2, 3( 10, 60 ) |
|     >>\*E ELEMENT ( ) −1 |
| >>\*E SEGMENT |
| >>\*SEGMENT CYL1B, 200, 3( 10, 50 ) |
|     >>\*ELEMENT E001, 1, 3( 20, 20 ) |
|     >>\*E ELEMENT ( −10, −10 ) 1 |
|     >>\* ELEMENT E002, 1, 3( 20, 20 ) |
|     >>\*E ELEMENT ( −10, −10, 50 ) −1 |
|     >>\*ELEMENT E003, 2, 3( 10, 50 ) |
|     >>\*E ELEMENT ( ) −1 |
| >>\*E SEGMENT |
| >>\*SEGMENT CYL2A, 200, 3( 10, 40 ) |
|     >>\*ELEMENT E001, 1, 3( 20, 20 ) |
|     >>\*E ELEMENT ( −10, −10 ) 1 |
|     >>\*ELEMENT E002, 1, 3( 20, 20 ) |
|     >>\*E ELEMENT ( −10, −10, 40 ) −1 |
|     >>\*ELEMENT E003, 2, 3( 10, 40 ) |
|     >>\*E ELEMENT ( ) −1 |
| >>\*E ELEMENT ( ) −1 |
| >>\*END |

| Developed Data |
| --- |
| >>\*START |

| Developed Data |
|---|
| \* OIL 1 PART - 3SUBPART ( CASE 1 U-MDL1 ) \*\*\*\*\*\*\*<br>>>\*PART TEST01 ( )<br>    >>\*SUBPART SUB1<br>    >>\*E SUBPART ( ) P<br>    >>\*SUBPART SUB2<br>    >>\*E SUBPART ( 15, 35 ) Q :HOLE<br>    >>\*SUBPART SUB2X<br>    >>\*E SUBPART ( 259, 35 ) Q :HOLE<br>    >>\*SUBPART SUB3<br>    >>\*E SUBPART ( 137, 35 ) Q<br>>>\*E PART<br>\*<br>>>\*SUBPART SUB1<br>    >>\*SEGMENT RCT1<br>    >>\*E SEGMENT ( ) P<br>    >>\*SEGMENT RCT2<br>    >>\*E SEGMENT ( 35 ) Q<br>    >>\*SEGMENT RCT3<br>    >>\*E SEGMENT ( 0, 0, 20 ) Q<br>>>\*E SUBPART<br>>>\*SUBPART SUB2<br>    >>\*SEGMENT CYL1 .EQ. PCYL01/CSUB1/CYL1A<br>    >>\*E SEGMENT ( ) P<br>    >>\*SEGMENT CYL2<br>    >>\*E SEGMENT ( ) P<br>>>\*E SUBPART<br>>>\*SUBPART SUB2X<br>    >>\*SEGMENT CYL1X EQ.PCYL01/CSUB1/CYL1A<br>    >>\*E SEGMENT ( ) P<br>    >>\*SEGMENT CYL2X<br>    >>\*E SEGMENT ( ) P<br>>>\*E SUBPART<br>>>\*SUBPART SUB3<br>    >>\*SEGMENT CYL3 .EQ. PCYL01/CSUB1/CYL1A<br>    >>\*E SEGMENT ( ) P<br>>>\*E SUBPART<br>\*<br>>>\*SEGMENT RCT1, 100, 3( 274, 50, 60 )<br>    >>\*ELEMENT E001, 1, 3( 274, 50 )<br>    >>\*E ELEMENT ( ) 1<br>    >>\*ELEMENT E002, 1, 3( 274, 50 )<br>    >>\*E ELEMENT ( 0, 0, 60 ) −1<br>    >>\*ELEMENT E003, 1, 2( 60, 274 )<br>    >>\*E ELEMENT ( ) 1<br>    >>\*ELEMENT E004, 1, 1( 50, 60 )<br>    >>\*E ELEMENT ( 274 ) −1<br>    >>\*ELEMENT E005, 1, 2( 60, 274 )<br>    >>\*E ELEMENT ( 0,50 ) −1<br>    >>\*ELEMENT E006, 1, 1( 50, 60 )<br>    >>\*E ELEMENT ( ) 1<br>>>\*E SEGMENT<br>>>\*SEGMENT RCT2, 100, 3( 204, 50, 12.5 )<br>    >>\*ELEMENT E001, 1, 3( 204, 50 )<br>    >>\*E ELEMENT ( ) 1<br>    >>\*ELEMENT E002, 1, 3( 204, 50 )<br>    >>\*E ELEMENT ( 0, 0, 12.5 ) −1<br>    >>\*ELEMENT E003, 1, 2( 12.5, 204 )<br>    >>\*E ELEMENT ( ) 1<br>    >>\*ELEMENT E004, 1, 1( 50, 12.5 )<br>    >>\*E ELEMENT ( 204 ) −1<br>    >>\*ELEMENT E005, 1, 2( 12.5, 204 )<br>    >>\*E ELEMENT ( 0, 50 ) −1<br>    >>\*ELEMENT E006, 1, 1( 50, 12.5 )<br>    >>\*E SEGMENT ( ) 1<br>>>\*E SEGMENT<br>>>\*SEGMENT RCT3, 100, 3 ( 274, 10, 40 )<br>    >>\*ELEMENT E001, 1, 3( 274, 10 )<br>    >>\*E ELEMENT ( ) 1<br>    >>\*ELEMENT E002, 1, 3( 274, 10 )<br>    >>\*E ELEMENT ( 0, 0, 40 ) −1<br>    >>\*ELEMENT E003, 1, 2(40, 274)<br>    >>\*E ELEMENT ( ) 1<br>    >>\*ELEMENT E004, 1, 1( 10, 40 )<br>    >>\*E ELEMENT ( 274 ) −1<br>    >>\*ELEMENT E005, 1, 2( 40, 274 )<br>    >>\*E ELEMENT ( 0, 10 ) −1<br>    >>\*ELEMENT E006, 1, 1( 10, 40 )<br>    >>\*E ELEMENT ( ) 1<br>>>\*E SEGMENT<br>>>\*SEGMENT CYL1, 200, 3( 10, 60 )<br>    >>\*ELEMENT E001, 1, 3( 20, 20 ) |

| Developed Data |
|---|
|     >>\*E ELEMENT ( −10, −10 ) 1<br>    >>\*ELEMENT E002, 1, 3( 20, 20 )<br>    >>\*E ELEMENT ( −10, −10, 60 ) −1<br>    >>\*ELEMENT E003, 2, 3( 10, 60 )<br>    >>\*E ELEMENT ( ) −1<br>>>\*E SEGMENT<br>>>\*SEGMENT CYL1X, 200, 3( 10, 60 )<br>    >>\*ELEMENT E001, 1, 3( 20, 20 )<br>    >>\*E ELEMENT ( −10, −10 ) 1<br>    >>\*ELEMENT E002, 1, 3( 20, 20 )<br>    >>\*E ELEMENT ( −10, −10, 60 ) −1<br>    >>\*ELEMENT E003, 2, 3( 10, 60 )<br>    >>\*E ELEMENT ( ) −1<br>>>\*E SEGMENT<br>>>\*SEGMENT CYL2, 200, 3( 15, 12.5 )<br>    >>\*ELEMENT E001, 1, 3( 15, 15 )<br>    >>\*E ELEMENT ( −7.5, −7.5 ) 1<br>    >>\*ELEMENT E002, 1, 3( 15, 15 )<br>    >>\*E ELEMENT ( −7.5. −7.5, 12.5 ) −1<br>    >>\*ELEMENT E003, 2, 3( 7.5, 12.5 )<br>    >>\*E ELEMENT ( ) −1<br>>>\*E SEGMENT<br>\*SEGMENT CYL2X, 200, 3( 15, 12.5 )<br>    >>\*ELEMENT E001, 1, 3( 15, 15 )<br>    >>\*E ELEMENT ( −7.5, −7.5 ) 1<br>    >>\*ELEMENT E002, 1, 3( 15, 15 )<br>    >>\*E ELEMENT ( −7.5, −7.5, 12.5 )−1<br>    >>\*ELEMENT E003, 2, 3( 7.5, 12.5 )<br>    >>\*E ELEMENT ( ) −1<br>>>\*E SEGMENT<br>>>\*SEGMENT CYL3, 200, 3( 10, 60 )<br>    >>\*ELEMENT E001, 1, 3( 20, 20 )<br>    >>\*E ELEMENT ( −10, −10 ) 1<br>    >>\*ELEMENT E002, 1, 3( 20, 20 )<br>    >>\*E ELEMENT ( −10, −10, 60 ) −1<br>    >>\*ELEMENT E003, 2, 3( 10, 60 )<br>    >>\*E ELEMENT ( ) −1<br>>>\*E SEGMENT<br>\* END \*\*\*\*\*\*\*<br>>>\*END |

| Shape Data Library |
|---|
| >>\*SEGMENT G0100, 100, 3( A, B, C )<br>    >>\*ELEMENT E001, 1, 3( A, B )<br>    >>\*E ELEMENT ( ) 1<br>    >>\*ELEMENT E002, 1, 3( A, B )<br>    >>\*E ELEMENT ( 0, 0, C ) −1<br>    >>\*ELEMENT E003, 1, 2( C, A )<br>    >>\*E ELEMENT ( ) 1<br>    >>\*ELEMENT E004, 1, 1( B, C )<br>    >>\*E ELEMENT ( A ) −1<br>    >>\*ELEMENT E005, 1, 2( C, A )<br>    >>\*E ELEMENT ( 0, B ) −1<br>    >>\*ELEMENT E006, 1, 1 ( B, C )<br>    >>\*E ELEMENT ( ) 1<br>>>\*E SEGMENT<br>    >>\*SEGMENT G0200, 200, 3( A, B )<br>    >>\*ELEMENT E001, 1, 3( A, A )<br>    >>\*E ELEMENT ( −A/2, −A/2 ) 1<br>    >>\*ELEMENT E002, 1, 3( A, A )<br>    >>\*E ELEMENT ( −A/2, −A/2, B ) −1<br>    >>\*ELEMENT E003, 2, 3( A/2, B )<br>    >>\*E ELEMENT ( ) −1<br>>>\*E SEGMENT |

Figure 24:
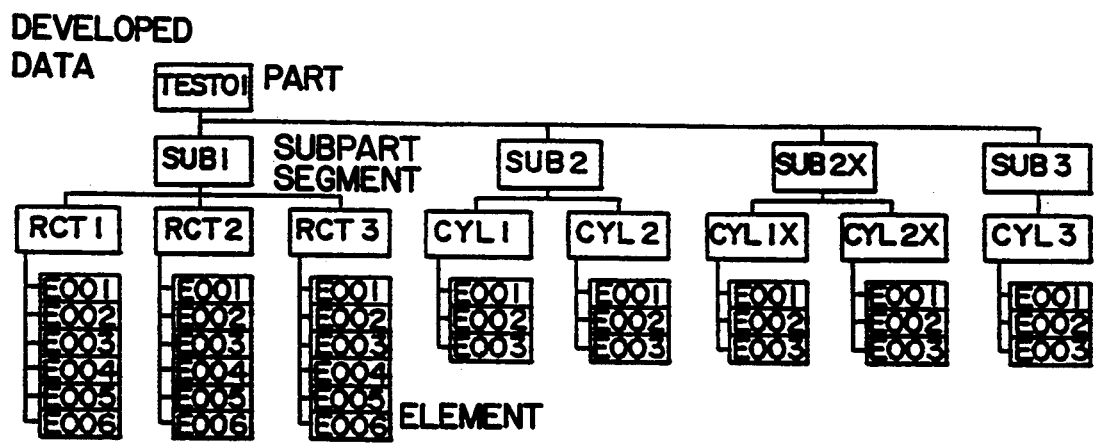

FIGS. 23 and 24 show the relation among above mentioned data in charts.

Figure 25A:
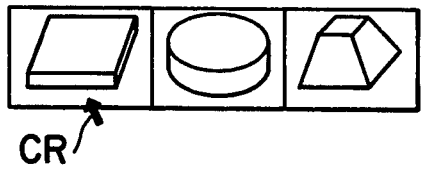
FIGS. 25A through 25ZE are examples of data input in the interactive operation system according to this invention.
Figure 25B:
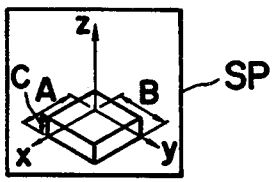
Figure 25C:
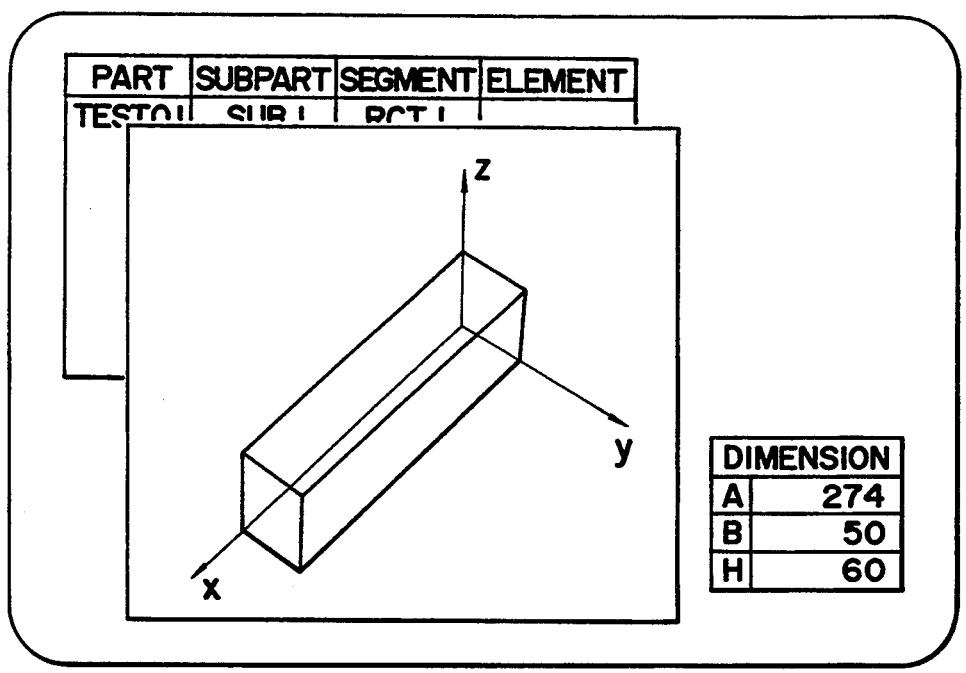
Figure 25D:
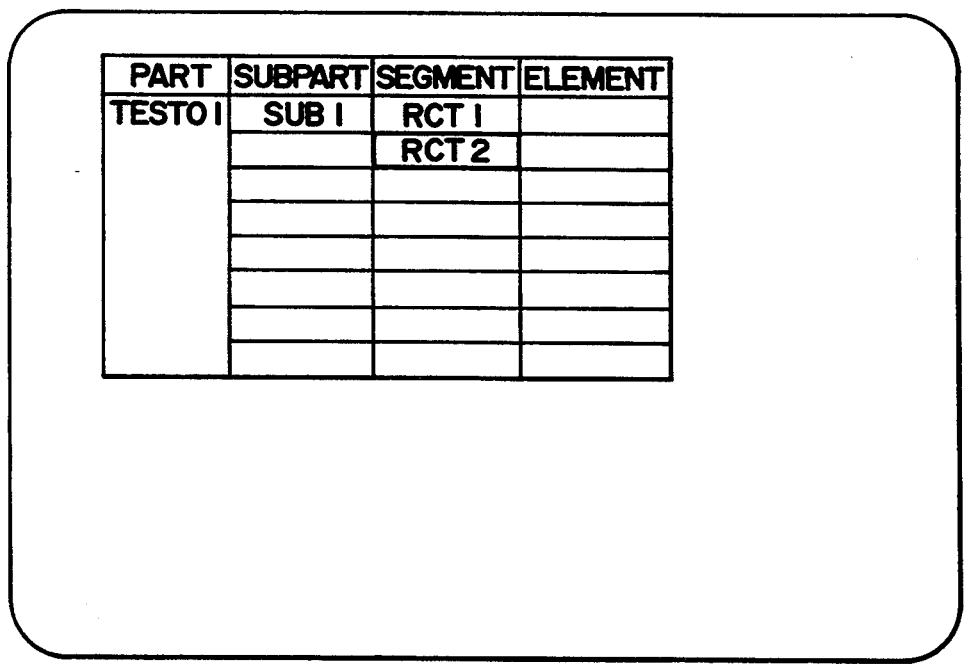
Figure 25E:
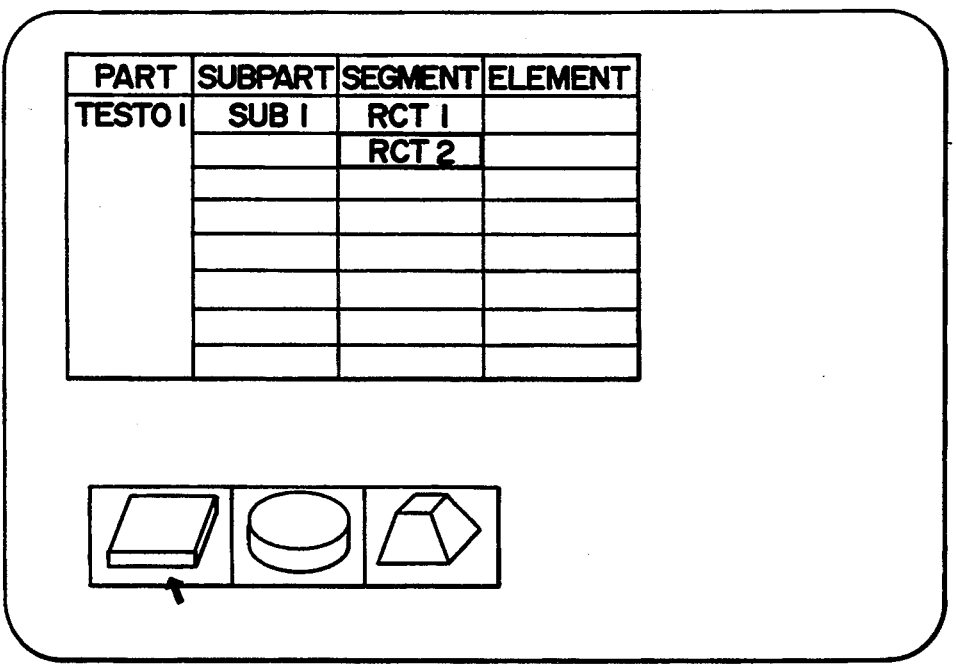
Figure 25F:
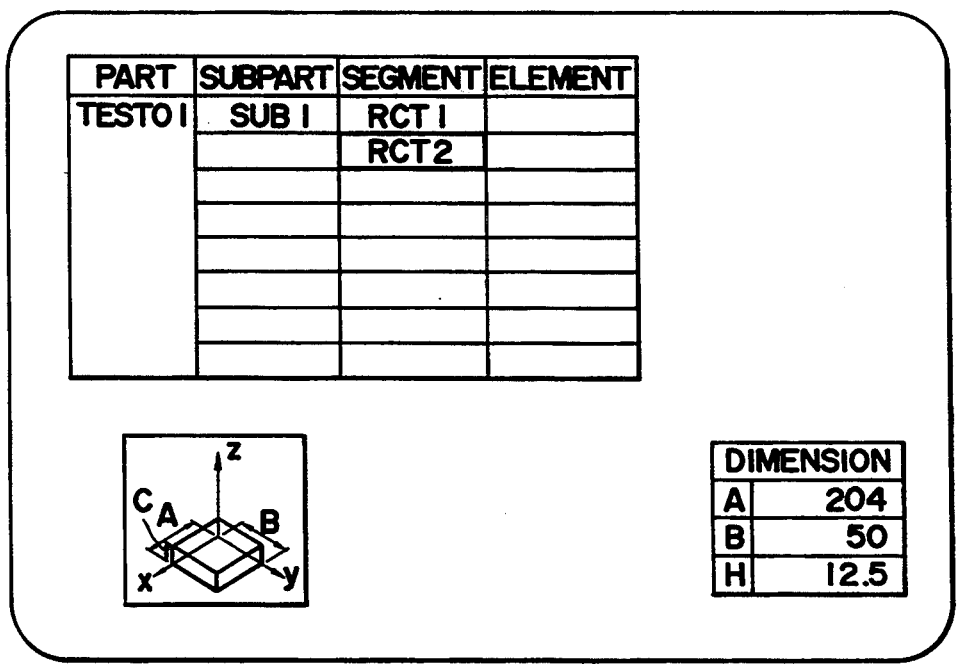
Figures 25G, 25H:
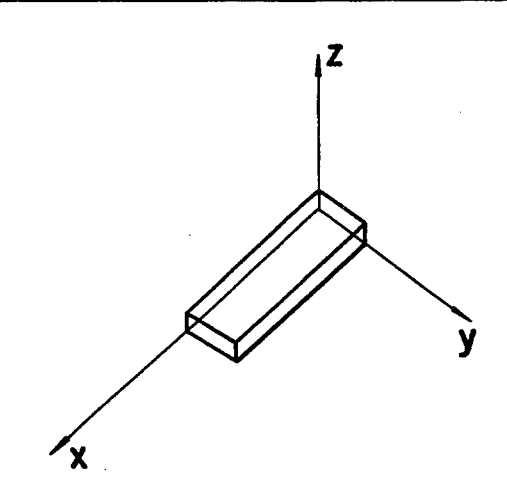
Figure 25:
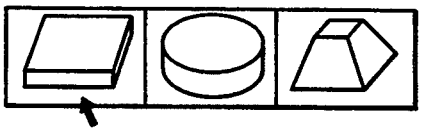
Figure 25:
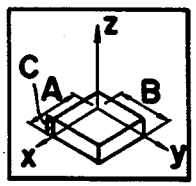
Figure 25K:
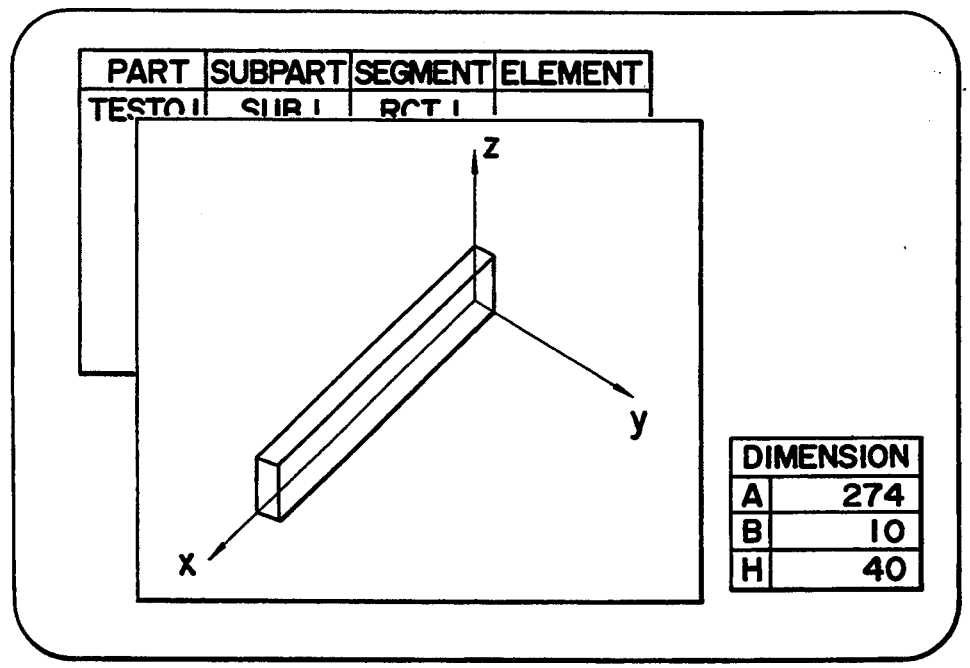
Figure 25L:
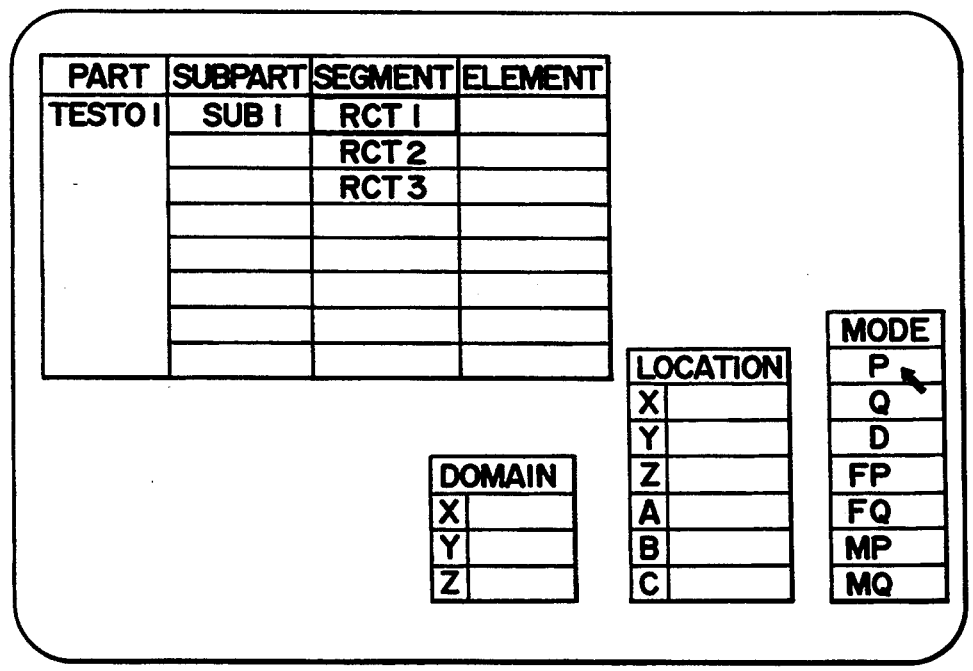
Figure 25:
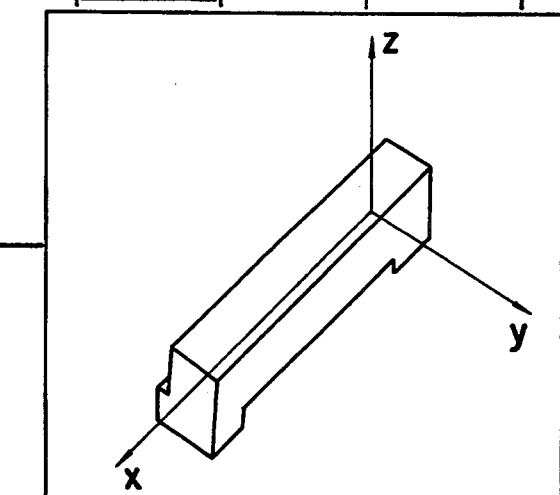
Figure 25S:
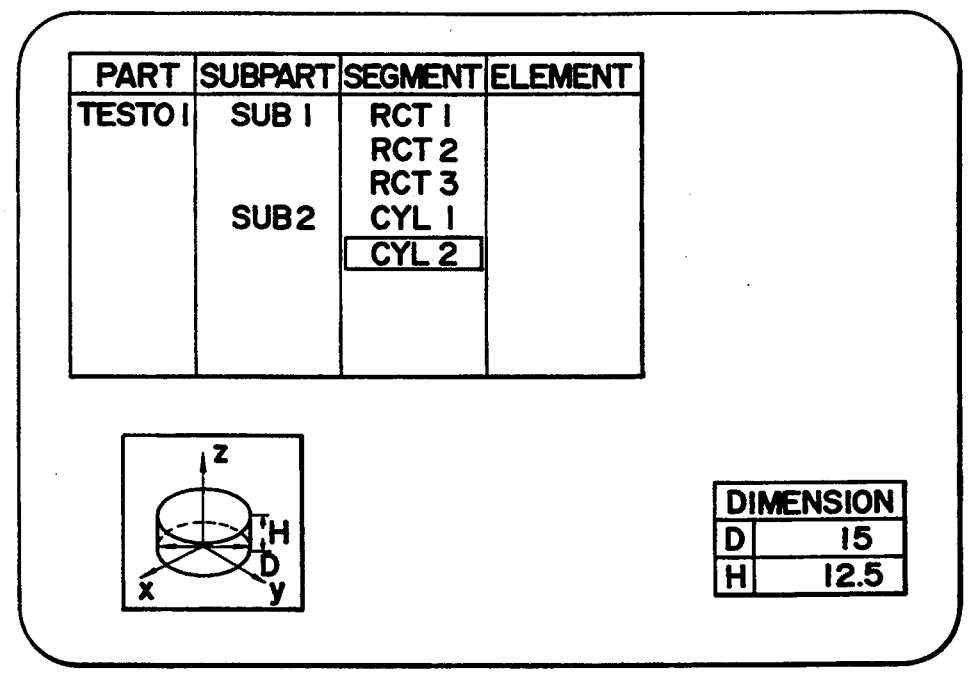
Figure 25T:
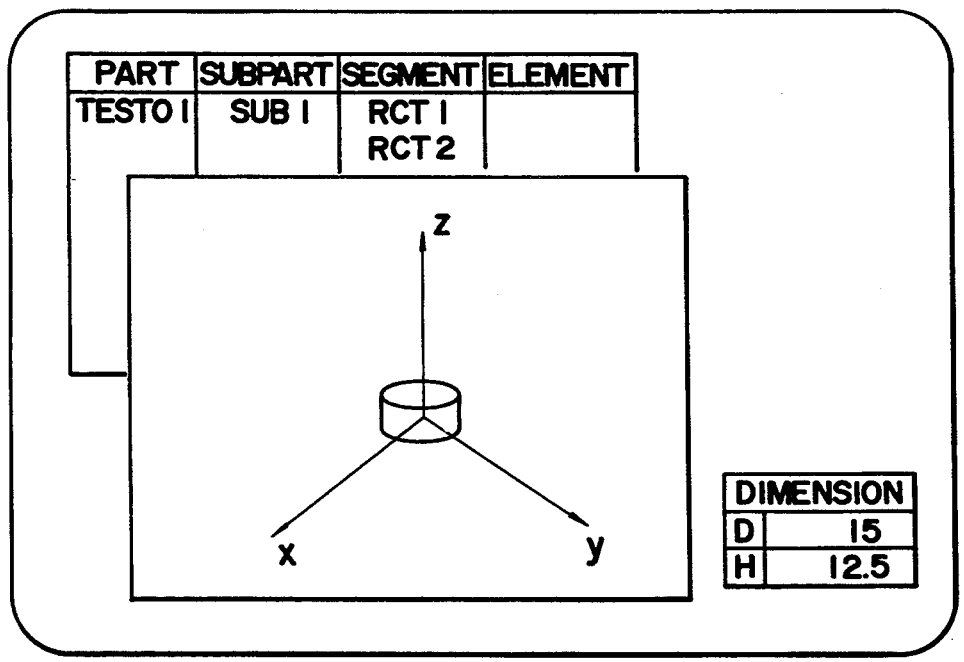
Figure 25U:
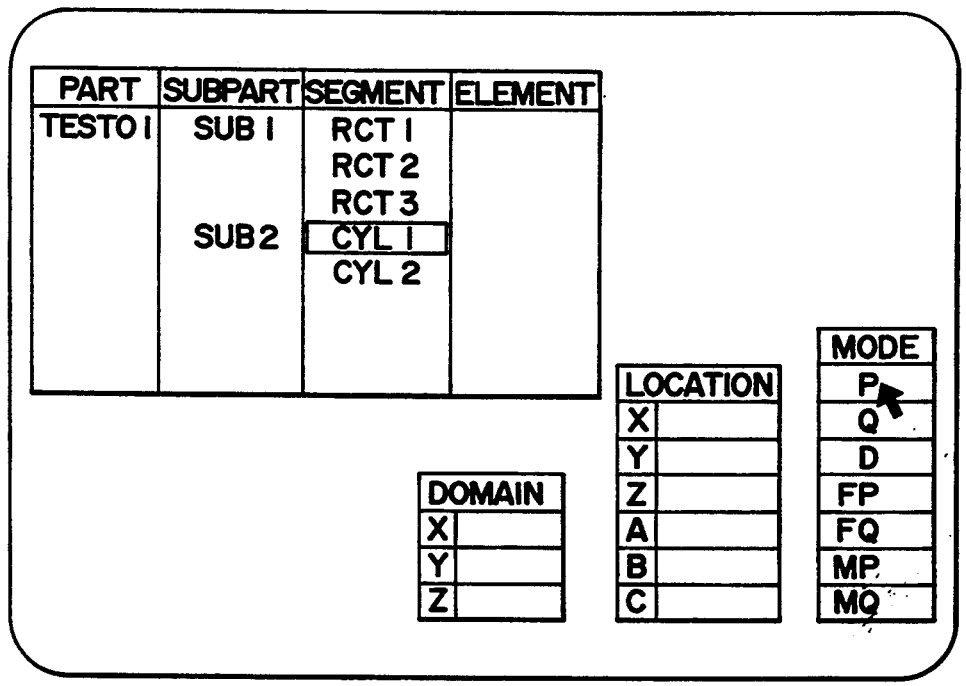
Figure 25V:
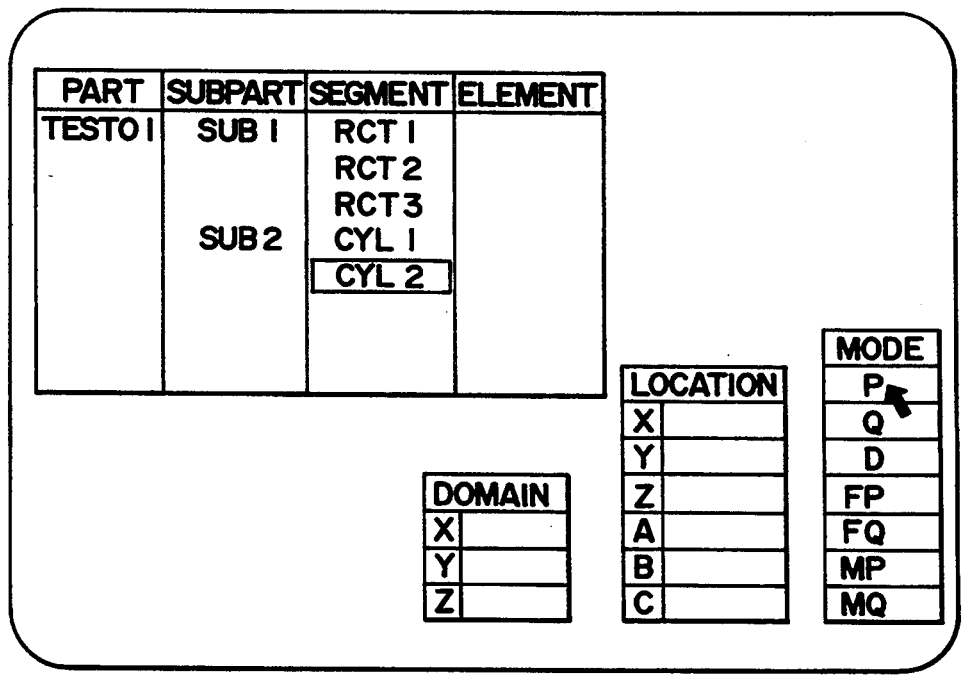
Figures 25W, 25X:
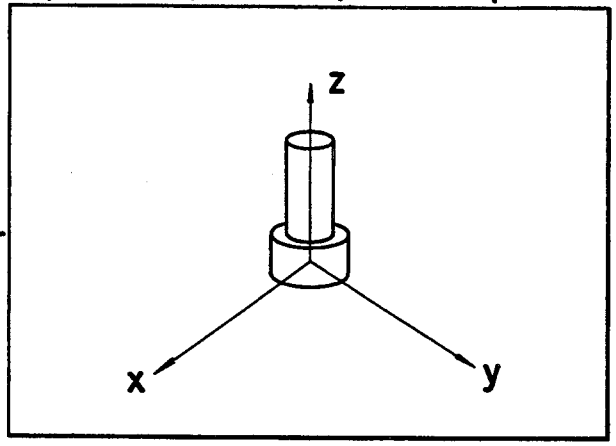
Figure 25Y:
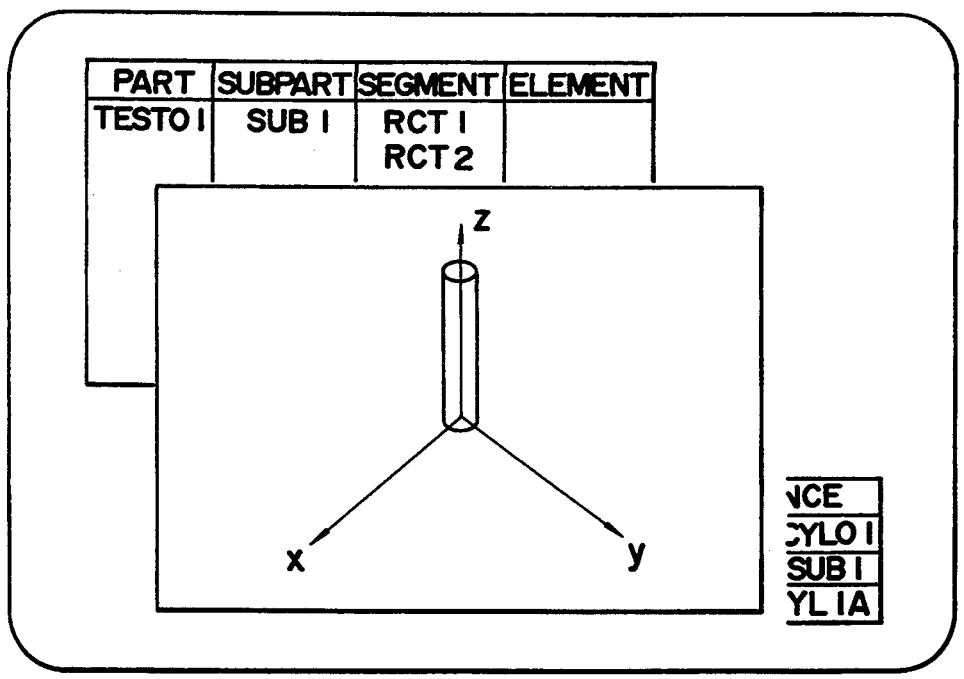
Figure 25Z:
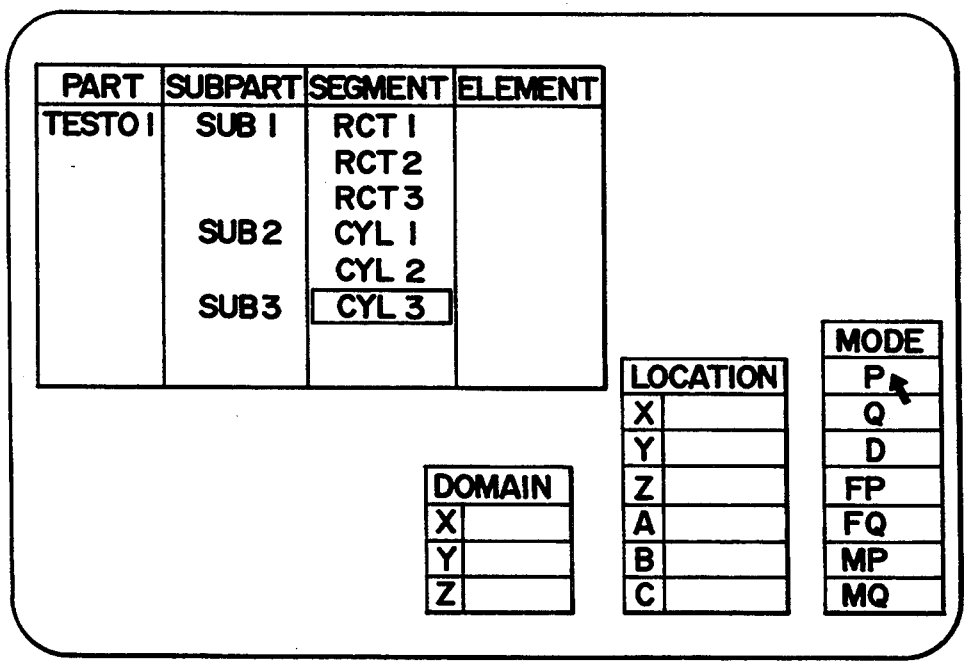
Figure 25Z:
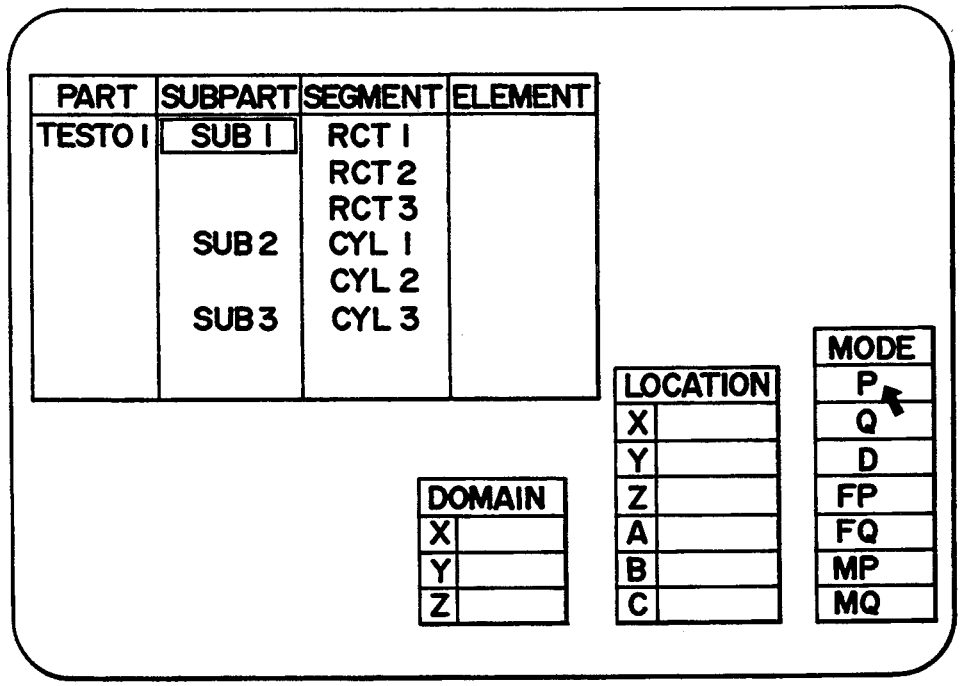
Figure 25Z:
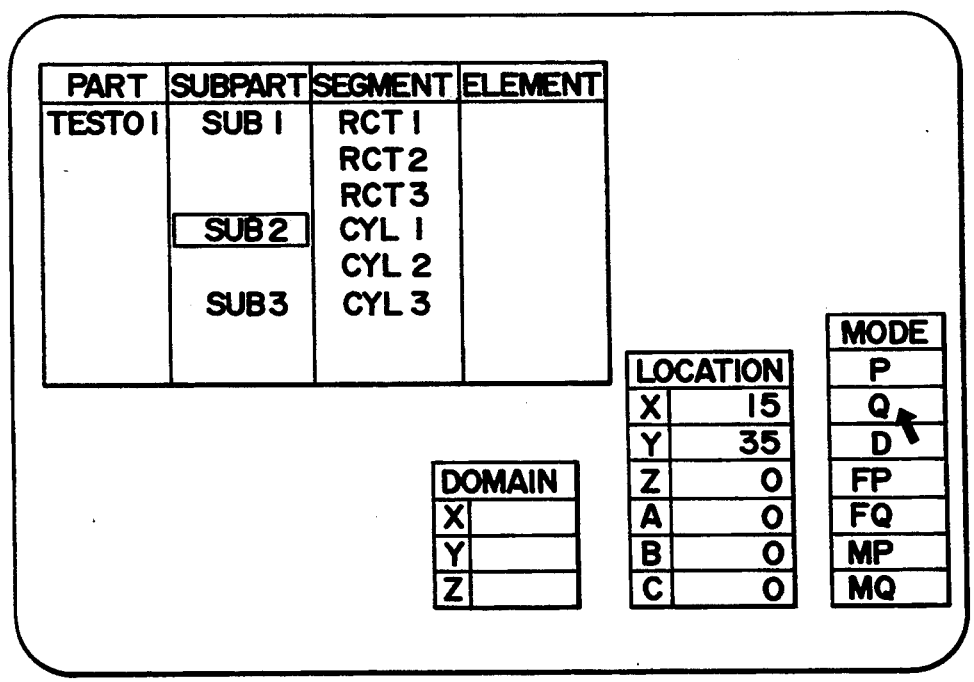
Figure 25Z:
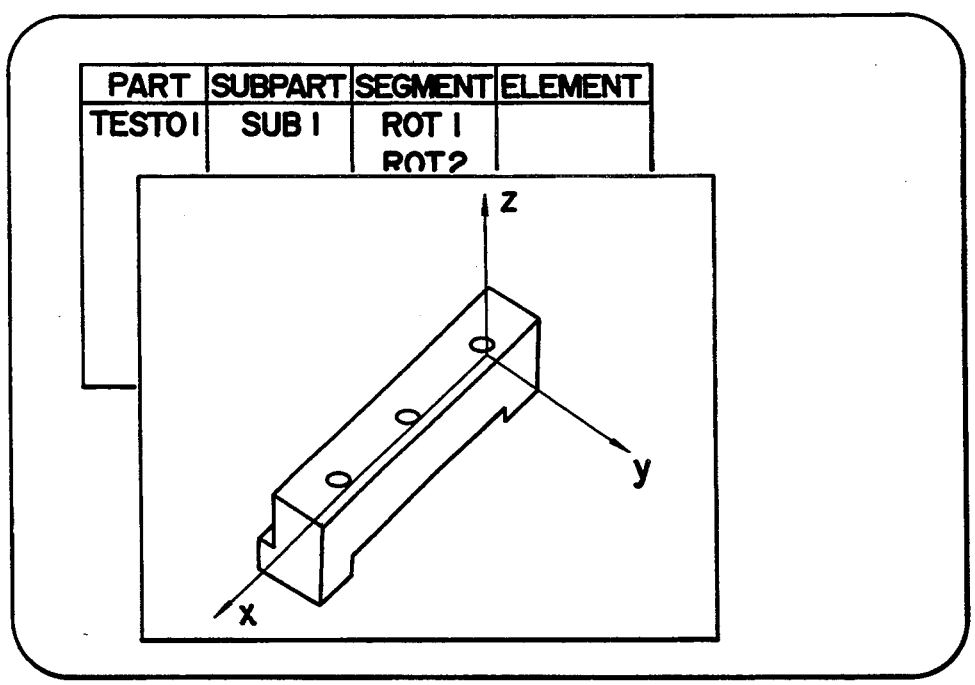

All the aforementioned shape data are inputted to the display unit 7A in an interactive operation, an FIGS. 25A through 25ZE describe the process therefor. The display unit 7A has a scrolling function, and a cursor CR is displayed on the screen as shown in FIG. 25A and can be moved by a mouse.

Since images of FIG. 25A are displayed on the screen of the display unit 7A, a user inputs the names of parts, subparts, segments and elements from an input unit 7B, and moves the cursor CR with the mouse to select a desired pattern. Any pattern can be selected from a large number of patterns by scrolling the screen. By selecting segments, a selected pattern SP is displayed on the screen as shown in FIG. 25B together with a dimension dialogue table DC. The user inputs dimensions on the dialogue table DC. In this example, dimensions are fed three-dimensionally. When dimensions are inputted, a segment shape corresponding to the dimensional specification appears on the screen as shown in FIG. 25C. Then the screen changes to the one shown in FIG. 25D. The user inputs the name of a segment from the keyboard. This causes patterns to be displayed on the screen as shown in FIG. 25E, and the user selects a pattern with a mouse by scrolling the screen in a manner similar to the above. When the selected pattern and a dimensional dialogue table are displayed on the screen as shown in FIG. 25F, the user inputs the dimension. The screen displays the segment shape with dimensions as shown in FIG. 25G, then the one shown in FIG. 25H. The user inputs the name of the segment from the keyboard. Then the screen displays various patterns of FIG. 25I, and the user selects one with the mouse. As the screen displays the selected pattern with dimensional dialogue table as shown in FIG. 25J, the user inputs the dimensions for the shape, and the screen displays the segment shape corresponding thereto as shown in FIG. 25K. The user information (on DOMAIN, LOCATION, MODE) about the input segments RCT1 through RCT3 in accordance to the instructions on the screen as shown in FIG. 25L through 25N.

The user then displays the shape of another subpart as shown in FIG. 25O, inputs the name of the segments as he is instructed from the screen as shown in FIG. 25P, and inputs the name of the reference segment on the REFERENCE dialogue table from the keyboard. This causes the referred segment to be displayed as shown in FIG. 25Q, and then the one displayed as shown in FIG. 25R. The user inputs the name of the segment CYL2, and selects a pattern with the mouse. The selected pattern and dimensional dialogue table are displayed on the screen as shown in FIG. 25S. The user inputs dimensions on the dialogue table. When the dimensions are inputted on the dialogue table, the segment shape with the dimensions in displayed as shown in FIG. 25T, and the user inputs the data such as DOMAIN, LOCATION, MODE) on inputted segments CYL1 and CYL2 in accordance with the instructions as shown in FIGS. 25U and 25V. Then the screen displays the shape of a subpart in FIG. 25W.

The user inputs the names of the subpart SUB3 and of the segment CYL3 according to the instruction on the screen in FIG. 25X. This makes the referred segment shape displayed as shown in FIG. 25Y. Then the user inputs the data on the segment CYL3 which forms the subpart SUB3 (DOMAIN, LOCATION, MODE) according to the instruction on the screen of FIG. 25Z. The shape displayed for the subpart SUB3 is identical to the one shown in FIG. 25Y. The user inputs the information on the subpart SUB1 and SUB2 which form the part TEST01 (DOMAIN, LOCATION, MODE) according to the instruction on FIGS. 25ZA and 25ZB. The user selects a pattern for layout of the subpart SUB2 from a large number of layouts as indicated in FIG. 25ZC, and inputs the layout information, and the data on the subpart SUB3 (DOMAIN, LOCATION, MODE). The screen finally displays the shape of the part TEST01 as shown in FIG. 25ZE.

As described in detail in the foregoing statement, this invention shape definition method expresses component elements of a three-dimensional solid model in a hierarchical structure, and provides each of the elements its own separate coordinate system to thereby simplify the definition of a solid model shape and input thereof as well as to greatly enhance the efficiency in CAD/CAM system.

As this invention interactive graphic input system allows definition of a shape by referring to graphical shapes displayed on the graphic display unit, an operator can assure with his/her own eyes the procedure of the machinings. As the operator can constantly ascertain with his/her own eyes the procedures of definition, he/she is less likely to make erroneous input.

It should be understood that many modifications and adaptations of the invention will become apparent to those skilled in the art and it is intended to encompass such obvious modifications and changes in the scope of the claims appended hereto.

What is claimed is:

1. An interactive graphic input method in a numerical control (NC) programming system which comprises a graphic display unit having means to display plural image frames, a keyboard for inputting alpha-numerals and codes, an input means such as a mouse unit which specifies an arbitrary position on the display screen of said graphic display unit with a cursor, a memory means for storing data, and a control and operation means for controlling and enabling the above respective units, said method comprising the steps of:

preparing a primitive data file in which data of primitives are stored and which is provided in said memory means;

preparing a shape data file in which data of shapes defined in structure are stored and which is provided in said memory means;

decomposing an environmental shape into a hierarchical structure of constructive solid geometry (CSG) and specifying a component element from a bottom level to a top level of said hierarchical structure when said environmental shape which is selected from the group consisting of a workpiece shape, a machine tool shape, a fixture shape, and a tool shape is defined from said keyboard and input means;

selecting one of plural primitives displayed on said graphic display unit by said input means in accordance with the data stored in said primitive data file and inputting dimensions of the selected primitive and an operation mode for setting a relation between the component elements from said keyboard and input means when said data of the primitives are inputted from said keyboard and input means and a name of the component element is inputted from said keyboard and input means;

inputting a name of the component element, a marked name of a referred element and the operation mode from said keyboard and input means when data of a shape derived from a lower level of said hierarchical structure due to an operation, a name of the input component element and the operation mode are inputted from said keyboard and input means, and if a level of said hierarchical structure in the defined shapes stored in said shape data file is available; and repeating the above operations to a highest level of said hierarchical structure thereby to store the input results in said shape data file.

2. An interactive graphic input method as claimed in claim 1, further including the step of simultaneously displaying an image for inputting the name of the component element, an image for selecting the primitive, and image for inputting the dimension of the selected primitive, and image for inputting the name of the operation mode and an image for inputting the name of the reference component element on said graphic display unit.

3. An interactive graphic input method as claimed in claim 2, wherein selecting the primitives is performed using an image frame which has a function of scrolling by said keyboard.

4. An interactive graphic input method as claimed in claim 2, wherein inputting of the dimensions of said selected primitives are performed respectively in an independent coordinate system on said graphic display unit.

5. An interactive graphic input method as claimed in claim 1, wherein inputting of said operations mode is performed by selecting any one of presence, deletion, support, permanent presence and permanent deletion.

6. An interactive graphic input method as claimed in claim 5, wherein a machining environment is constructed by referring, on said graphic display unit, the workpiece shape, the machine tool shape, the fixture shape and the tool shape which are respectively inputted from said keyboard and input means and stored in said shape data file, the machining environment is referred by using the presence, and then a tool path simulation is performed by referring a tool tracing space volume with the permanent deletion.

7. A method for defining shapes of a three dimensional solid model in computer aided design (CAD)/computer aided manufacturing (CAM) systems comprising the steps of:

expressing component element of said three-dimensional solid model in a hierarchical structure of shape data consisting of parts, subparts, segments and elements; and defining a shape by a set of said component elements by using a constructive solid geometry (CSG) defining method;

wherein a solid set operation between component elements at a same level is performed and a shape part at a next upper level is obtained, and said three-dimensional solid model is finally obtained by performing the above steps for each primitive from a lowest level to a highest level.

8. A method for defining shapes of a three-dimensional solid model in CAD/CAM systems as claimed in claim 7, wherein the component element in each level is mutually expressed in independent coordinates respectively, and said solid set operation is performed after transformation of the independent coordinates.

9. A method for defining shapes of a three-dimensional solid model in CAD/CAM systems as claimed in claim 7, wherein when an arbitrary hierarchical structure for said three-dimensional solid model is constructed, the component element in any level is expressed by referring the component element in any level of a hierarchical structure about other three-dimensional solid model.

10. A method for defining shapes of a three-dimensional solid model in CAD/CAM systems as claimed in claim 7, wherein said solid set operation is any one of presence, deletion, support, permanent presence and permanent deletion in an operation mode.

11. A method for defining shapes of a three-dimensional solid model in CAD/CAM systems as claimed in claim 7, wherein said component elements are attached with identification marks and are registered in data files.

12. A method for defining shapes of a three-dimensional solid model in CAD/CAM systems as claimed in claim 7, wherein said hierarchical structure comprises parts which mean all shape data within a domain for expressing said shapes and subparts which mean part shapes for expressing said parts, and said parts are a set of said subparts.

13. A method for defining shapes of a three-dimensional solid model in CAD/CAM systems as claimed in claim 12, wherein said hierarchical structure includes segments which mean three-dimensional shape elements to be used for expressing said subparts, and said subparts are a set of said segments.

14. A method for defining shapes of a three-dimensional solid model in CAD/CAM systems as claimed in claim 12, wherein said hierarchical structure includes elements which means flat surfaces and two-dimensional curved surfaces which are used for expressing said segments and said segment is a product set of said elements which are made directional to be a half space.

* * * * *